United States Patent [19]

Merat et al.

[11] Patent Number: 5,465,221

[45] Date of Patent: Nov. 7, 1995

[54] AUTOMATED PROCESS PLANNING FOR QUALITY CONTROL INSPECTION

[75] Inventors: Francis L. Merat, University Heights; Kavous Roumina, Westlake; Steven M. Ruegsegger, Centerville; Robert B. Delvalle, Cleveland Heights, all of Ohio

[73] Assignee: The United States of America as represented by the Secretary of the Air Force, Washington, D.C.

[21] Appl. No.: 179,596

[22] Filed: Dec. 30, 1993

[51] Int. Cl.$^6$ .................................................. G06F 17/50
[52] U.S. Cl. ............... 364/552; 364/474.02; 364/474.15; 364/474.24; 395/904
[58] Field of Search ................ 364/474.02, 474.15, 364/474.24, 552; 395/904

[56] References Cited

U.S. PATENT DOCUMENTS

| | | | |
|---|---|---|---|
| 4,550,532 | 11/1985 | Fletcher, Jr. et al. | 364/474.06 X |
| 5,023,800 | 6/1991 | Carver et al. | 364/474.24 |
| 5,123,087 | 6/1992 | Newell et al. | 395/155 |
| 5,187,788 | 2/1993 | Marmelstein | 395/700 |
| 5,208,768 | 5/1993 | Simoudis | 364/578 |

OTHER PUBLICATIONS

Merat et al "Automated Inspection Planning within the Rapid Design System"; Proceeding of 1991 IEEE International Conference on System Engineering, Aug. 1991. pp. 42–48.
Ruegsegger: "Intelligent Automated Process Planning and Code Generation for Computer–Controlled Inspection": Jan. 1993, pp. 1–135.
Ruegsegger: "Intelligent Planning for Computer Controlled Inspection"; Wright Laboratories, Jul. 1993.
Ruegsegger: "Intelligent Scheduling Optimization Using Rule–Based Artificial Neural Network"; Wright Laboratories May 1993.
Ruegsegger: "Intelligent Scheduling for Automated Inspection"; Wright Laboratories, Apr. 1993.
Delvalle et al: "Heuristic Planning in Feature Based Inspection for Coordinate Measuring Machines" Wright Laboratories, Apr. 1993.
LeClair, Steve, "Rapid Design System: Memory–Driven Feature–Based Design", Proceedings of 1991 IEEE International Systems Conference, Dayton, Ohio, Aug. 1991 pp. 35–37.
Pao et al, "A Computer–Based Adaptive Associative Memory in Support of Design," *Proceedins of the 1991 IEEE Conference on System Engineering*, Aug. 3, 1991, Dayton Ohio, 49–55.
Radack et al, "Positioning Features Within the Rapid Design System", *Proceedings of the 1991 IEEE Conference on System Engineering*, Aug. 3, 1991, Dayton, OH, 38–41.
Westhoven, 1991, *Feature Sequencing in Process Planning using an Episodal Associative Memory*, Master's Thesis, Wright State University, Dayton, Ohio 1991.

(List continued on next page.)

Primary Examiner—Edward R. Cosimano
Attorney, Agent, or Firm—Bernard E. Franz; Thomas L. Kundert

[57] ABSTRACT

A computer is used for generating a part inspection plan for a coordinate measuring machine (CMM), in a feature-based rapid design system (RDS), having a Feature-Based Design Environment (FBDE), an Episodal Associative Memory (EAM), Fabrication Planning (FAB), and an Inspection Plan (INSP), with features which include form features (D1) which define the form or shape of the part, manufacturing features (D2), inspection features (D3), and geometric and design (GD&T) features (D4). The Inspection Plan (INSP) includes interaction means wherein the inspector interacts with the system to guide it to a desired result, and the inspector can define setups, measurement points, sequence for the points, and the via points. For the inspector's sequence input, a learning process is included, so that the inspector's desired sequence is sent to discovery means for organizing patterns and defining rules, which by recalling relevant past experiences, and learning from the inspector's input, creates a "self-improving" expert system.

24 Claims, 13 Drawing Sheets

OTHER PUBLICATIONS

Preparata, F. P. and S. J. Hong, "Convex Hulls of Finite Sets of Points in Two and Three dimensions," *Communicatons of the ACM*, vol. 20, No. 2, Feb. 1977, pp. 87–93.

Jeon, O–Keon, "Efficient Inspection Path Planning Algorithm," M. S. Thesis, Case Western Reserve University, Cleveland, Ohio, Aug., 1990.

J. J. Hopfield and D. W. Tank, "Neural Computation of Decisions in Optimization Problems," *Biological Cybernetics*, 52, 141–152, 1985.

Kosiba, Wright, and Cobbs "Discrete Event Sequencing as a Traveling Salesman Problem," *Computers in Industry*, 19, 317–327, 1992.

Sample part dimensioned and toleranced according to GD&T standard

LK Micro Vector coordinate coordinate measuring machine simple xyz movement 2-degree-of-freedom probe holder extension, but no additional d-o-f Detailed inspection feature geometries

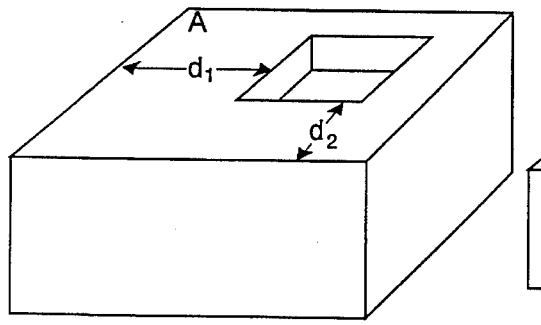
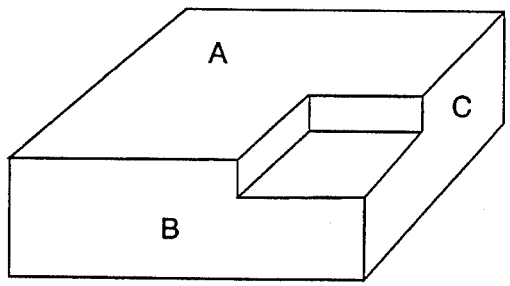
Positioning of: (a) A slot (b) A step to shoulder
Fig. 11a  Fig. 11b
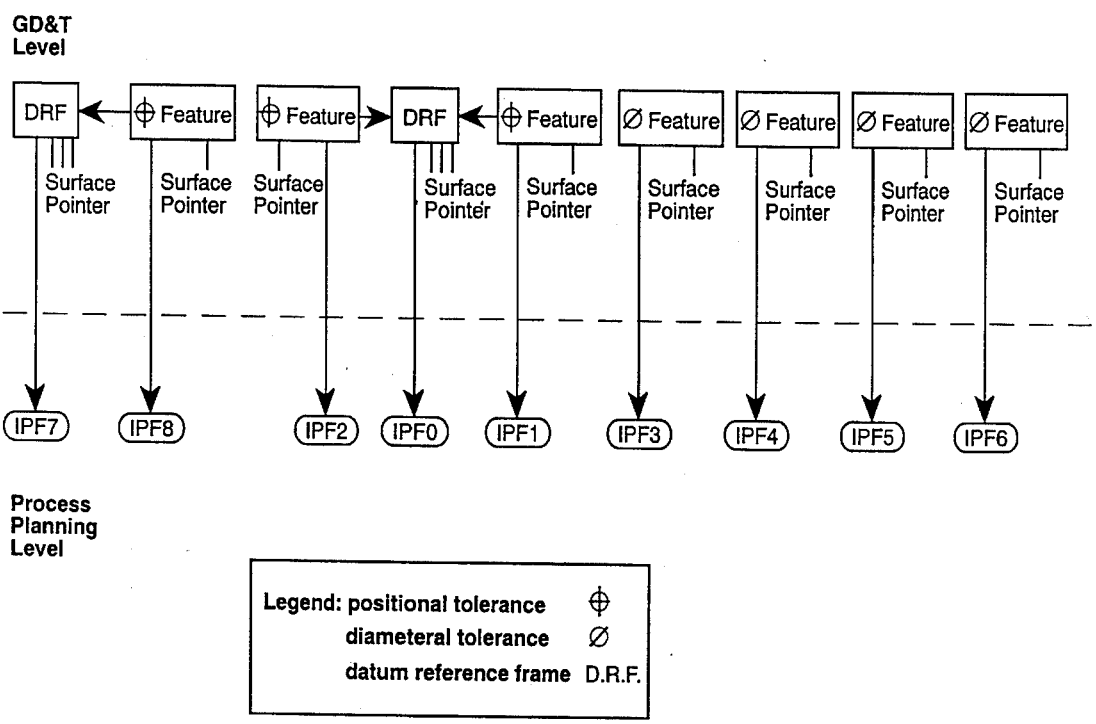
Relationship between GD&T and inspection plan fragments (For example (for example of Fig. 4)
Fig. 13

Coordinate system formed by intersecting three mutually perpendicular planes

Sequence position

| | | 1st | 2nd | 3rd | 4th | 5th | 6th | 7th |
|---|---|---|---|---|---|---|---|---|
| tertiary | $pt_0$ | 1 | 0 | 0 | 0 | 0 | 0 | 0 |
| "critical" | $pt_1$ | 0 | 1 | 1 | 0 | 0 | 0 | 0 |
| | $pt_2$ | 0 | 0 | 0 | 1 | 1 | 1 | 1 |
| | $pt_3$ | 0 | 0 | 0 | 1 | 1 | 1 | 1 |
| | $pt_4$ | 0 | 0 | 0 | 1 | 1 | 1 | 1 |
| | $pt_5$ | 0 | 0 | 0 | 1 | 1 | 1 | 1 |
| "critical" | $pt_6$ | 0 | 1 | 1 | 0 | 0 | 0 | 0 |

1 = favorable for point in the plan sequence position
0 = unfavorable for point in this plan sequence position Populating the S matrix

*Fig. 17*

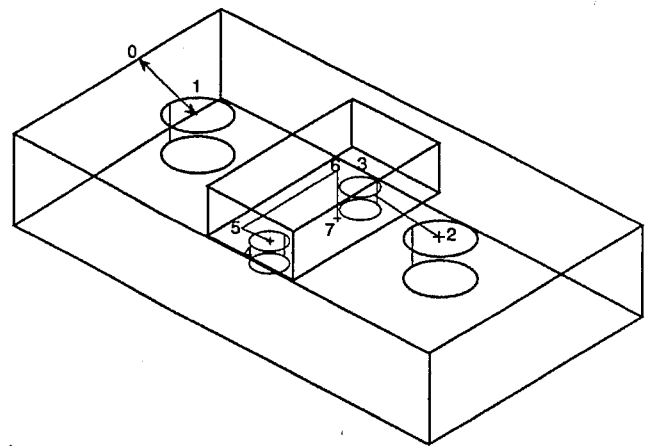

Illustration of rule-based ANN sequence result

$$\frac{dU_{ij}}{dt} = \begin{cases} -\left(A \cdot \left(\sum_{k}^{N} V_{ik} + \sum_{k}^{N} V_{kj} - 2\right)\right) \\ -\left(B \cdot \left(\sum_{k}^{N} V_{k,j+1} + \sum_{k}^{N} V_{k,j-1}\right) \cdot W_{ik}\right) \\ -\left(C \cdot \sum_{p=0}^{N} \sum_{q=0}^{N} V_{p,,j-1} V_{p,,j+1} \cdot W_{pij}\right) \\ +\left(D \cdot h\left(\sum_{k}^{N} V_{ik}\right) \cdot h\left(\sum_{k}^{N} V_{ik}\right)\right) \\ -\left(F \cdot \sum_{k}^{N} (V_{p,,j-1} \cdot F_{pi} + V_{p,,j+1} \cdot F_{ip})\right) \\ +S_{ij} \end{cases}$$

AUTOMATED PROCESS PLANNING FOR QUALITY CONTROL INSPECTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to automated process planning for quality control inspection.

A related patent application by Steven R. LeClair et al titled "INDUCTIVE-DEDUCTIVE PROCESS DESIGN FOR MACHINED PARTS", Ser. No. 08/159,968, filed Nov. 30, 1993, discloses a feature-based technique which, along with the present invention, are part of a Rapid Design System.

The task of the Quality Assurance (QA) engineer is to determine if the geometries of the product are within the specified tolerances created by the design engineer. The results should determine whether or not the product will perform its desired functions correctly. Today's technologies have provided a diverse range of automated inspection systems for QA. The most popular have been vision systems and coordinate measurement machines (CMM), which are beginning to be used extensively in industry for automated industrial inspection of machined parts. Advanced graphical programming tools have also simplified some aspects of the automated inspection process. Computer-aided design, process planners, path planners, and simulators provide assistance to the inspector.

The CMM has become very popular due to new technologies increasing its speed and accuracy, allowing more than 60 measurements per minute with accuracies to 0.00001 inch. Therefore, the new challenges surrounding CMMs are not seen in the act of data retrieval, but rather the planning before and after data acquisition and retrieval—where to take the inspection measurements, how to sequence the inspections for efficiency, and how to evaluate them once they are taken.

It is quite time-consuming for an inspector to understand a drawing or blue-print and determine how to inspect the part. The interaction of geometry/function/tolerance is not apparent without careful study. Recently, there is a new government tolerancing language standard—Geometric Design and Tolerance (GD&T)—which is also emerging as the industry standard. This will help to standardize the communication between the designer and the inspector, but even an experienced inspector must interpret the designer's intent for the workpiece functionality, which is what inspection techniques are based upon.

Once the relationship between part functionality and tolerance callouts are established by the inspector, the process plan is created. The functionality of the part is first used to specify the setup orientations, which define the fixturing, if needed. Throughout the planning process, some tasks are inherently more difficult to the inspector than others. The tasks mentioned here—creating setups, placing fixtures, and determining coordinate frames—are not terribly cumbersome for the experienced Inspector. Other tasks to follow, like calculating the measurement points and via points (specified to a degree of accuracy, usually in the thousanths of an inch), will prove much more work intensive and critical to the inspector.

Often there are several coordinate frames within a setup, meaning that three dimensional coordinate transformations must be performed to calculate the inspection coordinates from the designer coordinate reference frame. From our study of inspectors, this is done with paper and pencil using a handheld calculator—even with a Masters degree in mathematics, this task is difficult and takes a large amount of time!

The measurement points must then be sequenced. An inspector will use various criteria for ordering the points. These vary from shortest path distance, to tolerance/evaluation organization. From our studies, we noticed that often the points are sequenced so that variant process planning—creating a new process plan from editing the process plan of a similar part—is most easily performed. This entails grouping together points from the same tolerance evaluation for the ease of cutting and pasting for a similar part.

It is imperative that the sequenced path is checked for collisions. As is sure to be the case, the path connecting the sequenced measurement points will intersect with the workpiece or fixtures. To correct this, via points are created to avoid the obstacle. This task is very time consuming for the inspector. The chance of human error is high since the via point coordinate must be found from the design specifications and then translated into the coordinate reference frame that contains it. It is also very important that this be cone accurately, since an error in calculation can cause a collision, damaging a very expensive probe. This process has a high risk assessment since there is a rather high probability of error with a high cost from an error.

Finally, the process plan is translated to the instruction language of the CMM performing the measurement and evaluation. The inspector usually types this into his word processor from the process plan sketched out on several handwritten notes. Not only are these inspection languages cryptic and hard to remember, but the keyboard entering of the code is extremely important. One small typographical error or misplaced minus sign could cause a large undesirable result: an improperly evaluated tolerance resulting in erroneous acceptance or rejection of tolerance; a measurement of a non-existing point halting the process plan; or worse, a probe crash into the workpiece, a fixture, or the CMM table top. This process also has a high risk assessment and must be re-checked several times for accuracy.

Some CMM vendors have created computerized aides for the inspector. They simply consist of macros where the inspector fills in blanks with his own coordinate point calculations. This helps the inspector tackle the problem of remembering some of the cryptic CMM instructions, but does not help create the precise coordinate points that must be entered, and sequence both the setups and the measurement points within the setups. Research in automated inspection planning to date has discussed development of inspection planners for only turned parts and sculptured surfaces to the best of our knowledge.

The following United States patents are of interest.

Simoudis U.S. Pat. No. 5,208,768

Marmelstein U.S. Pat. No. 5,187,788

Newell et al U.S. Pat. No. 5,123,087

Carver et al U.S. Pat. No. 5,023,800

The patent to Simoudis discloses a discrepancy determination component that identifies a discrepancy between operation of an original design and a desired operation. The patent to Marmelstein discloses an automatic code generation tool which allows the programmer to quickly create a graphical representation of the programmer's initial program design. The patent to Newell et al discloses a computer aided drafting system and methods for automatically locating geometric points. The patent to Carver et al discloses a 3-dimensional computer system having a graphics definition of an article located in a system memory.

It can be quite time-consuming for an inspector to understand a drawing and determine how to inspect a part. Programming CMMs is also time-consuming, tedious, and highly susceptible to human error. This overhead is particularly critical when it is spread over a small number of parts.

SUMMARY OF THE INVENTION

An objective of the invention is to provide an automated inspection system to reduce the time between part design and final inspection, cutting costs and allowing better response.

By generating the inspection plan when the part is being designed, the system can aid the designer in producing part designs that do not require unnecessary inspection procedures and eliminate confusion between the designer and inspector over part inspection requirements.

The invention relates to a an automated inspection planning architecture for quality control. This is the first complete, fully automated inspection plan and Coordinate Measuring Machine (CMM) code generator. This system, if modeled as a black box, receives the inputs of geometry and tolerance information and generates the output of CMM instructions which evaluates the designer's tolerances. Also, the computer provides several areas of critical error avoidance and improved accuracy. The coordinates of the measurement and via points are created and then transformed to the proper inspection coordinate frame by rotation and translation of the coordinate axes, avoiding mathematical errors. Also the probe path to be followed and the workpiece geometry can be intersected easily to check for collisions, avoiding careless and unintentional human errors. The cryptic CMM commands and precise coordinate points are correctly generated by the translator, avoiding typographical errors.

Our research has focused not only on inspection process planning, but also on product/process integration. The design specifications of the workpiece are represented by features which hold intelligence about themselves—they know how to machine and inspect themselves. We have also focused on the use of artificial intelligence (AI) algorithms: Artificial Neural Networks (ANNs) for optimization and classification, and associative memories for storage/retrieval. These techniques are used to create a complete and automated process planner for the QC engineer. It is complete in that kit automates the entire generation process planning task, starting from the design and tolerance representation through to the CMM instruction code for measurement and evaluation of tolerances.

The generative process planning approach begins with the designer entering the product geometry and tolerances into a feature-based, solid modeling, front-end CAD system. AI heuristics, inspection rules, and AI optimization techniques transform the geometry and tolerance features into an inspection plan. This includes setup creation, setup sequencing, measurement point creation, measurement point sequencing, collision-free path generation, and CMM code.

Advantages and New Features

First, this is the first complete, fully-automated inspection plan and CMM code generator. This system, if modeled as a black box, receives the inputs of geometry and tolerance information and generates the output of CMM instructions which evaluates the designer's tolerances. This allows the automated inspection planner (this invention) to perform the commonplace jobs, while the inspector concentrates on the truly difficult and unusual tasks.

Secondly, the computer provides several areas of critical error-avoidance and improved accuracy. The coordinates of the measurements and via points are created and then transformed to the proper inspection coordinate frame by rotation and translation of the coordinate axes, avoiding mathematical errors. Also, the probe path and the workpiece geometry can be intersected easily to check for collisions, avoiding careless and unintentional human errors. The cryptic CMM commands and precise coordinate points are correctly generated by the translator, avoiding typographical errors.

Converse to the viewing the system as a black-box, the inspector can have interaction with the system to guide it to his desired result. He can define the setups, measurement points, sequence for the points, and the via points. Specifically for the inspector's sequence input, a learning process is desired. The inspector's desired sequence is sent to a discovery module where patterns are organized and rules defined (future). This provides "self-improvement" to the system that is not seen in any other similar system.

BRIEF DESCRIPTION OF THE DRAWING

FIGS. 11a and 11b are pictorial diagrams showing positioning of a slot in FIG. 11a and positioning of a step to shoulder in FIG. 11b;

FIG. 13 is a diagram showing the relationship between GD&T and inspection plan fragments (for example of FIG. 4);

FIG. 17 is a diagram showing populating the $\underline{S}$ matrix for an automatic neural network;

FIG. 18 show, an equation for an automatic neural network; and

FIG. 19 is a pictorial diagram which is an illustration of a rule-based automatic neural network sequence result.

DETAILED DESCRIPTION

The following six items, copies of which are included as a part of this application as filed, include disclosures of the invention, and are hereby incorporated by reference.

1. Ruegsegger, Steven M., Intelligent Automated Process Planning and Code Generation for Computer Controlled Inspection, Masters Thesis, Case Western Reserve University, January 1993.

2. Pao, Y. H., Merat, F. L., & Radack, G. M., Memory-driven, Feature Based Design, WL-TR-93-4021, Materials Directorate, Wright-Patterson AFB, Ohio, January 1993, Case Western University Contract Number F33615-87-C-5250, Distributed January 1993.

3. Delvalle, Robert B., K. Roumina, S. Ruegsegger, and F. Merat, "Heuristic Planning in Feature-based Inspection for Coordinate Measuring Machines," *Proceedings of the Eleventh Applications of Artificial Intelligence Conference, AAI-XI: Knowledge-Based Systems in Aerospace & Industry.* Orlando, Fla., April 1993.

4. Ruegsegger, Steven M. "Intelligent Scheduling for Automated Inspection," *Proceedings of the* 1993 *Neural Network Applications for Manufacturing Process Control.* Troy, Mich., April 1993.

5. Ruegsegger, Steven M. "Intelligent Scheduling Optimization Using a Rule-based Artificial Neural Network," *Proceedings of the 46th NAECON*, Dayton Ohio, May 1993.

6. Ruegsegger, Steven M. "Intelligent Planning for Computer-controlled Inspection," *Proceedings of the* 1993 *International Neural Network Society Annual Meeting, World Congress*, Portland, Ore. July 1993.

Introduction

The task of the Quality Assurance (QA) engineer is to determine if the geometries of the product are within the specified tolerances created by the design engineer. The results should determine whether or not the product will perform its desired functions correctly. Today's technologies have provided a diverse range of automated inspection systems for QA. The primary measurement technique used in automated industrial inspection of machined parts is the coordinate measurement machine. Advanced graphical programming tools have also simplified some aspects of the automated inspection process. Computer-aided design, process planners, path planners, and simulators provide assistance to the inspector.

This specification discusses the implementation of an automated inspection planner operating within a feature-based concurrent engineering system called the Rapid Design System (RDS).

Figure 1:
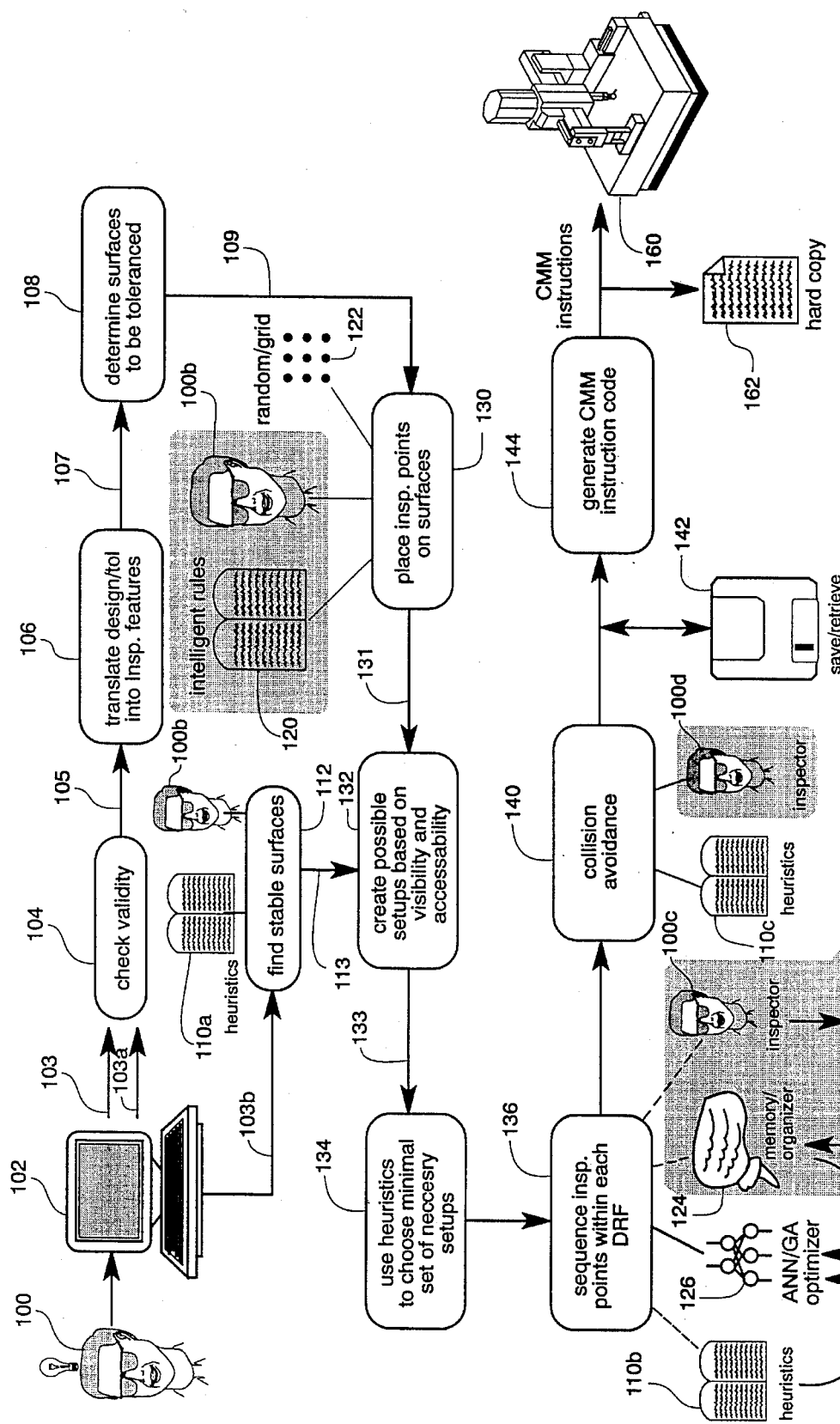
FIG. 1 is a diagram showing an inspection planning and evaluation module architecture.

The automated inspection planning architecture is shown in FIG. 1. The geometry and tolerance features are the input to the planner, and translated into inspection features used for solid-geometrical reasoning. AI heuristics use the inspection features and solid geometry to begin the process planning (as would an inspector).

To begin, an inspector 100 inputs an idea to the computer 102. The GD&T features represented by line 103, and design features represented by line 103a, are checked for validity at block 104. From block 104, valid combinations represented by line 105 go to block 106 which translates design/ tolerance features into inspection features on line 107 to block 108. At block 108, the process determines surfaces to be toleranced. The inspection features are then supplied via line 109 to block 130. Block 130 also has inputs from stored intelligent rules 120, from the inspector represented at 100b, and from a random grid 122. With these inputs, block 130 processes the information to place inspection points on surfaces, and via line 131 supplies the inspection features with points to be measured to block 132. The computer via line 103b supplies a part model to block 112 to find stable surfaces, and block 112 via line 113 provides possible setups to block 132. Block 132 represents the processing of information received via lines 131 and 113 to create possible setups based on visibility and accessibility. Possible setups are supplied from block 142 via line 133 to block 134, which uses heuristics to choose a minimal set of necessary setups, and then supplies an inspection process plan to block 136. Block 136 provides the sequence inspection points within each Datum Reference Frame (DRF), with inputs from heuristics 110b via an ANN/GA optimizer 126, and 'self improvement' using information from the inspector shown at 100d via a discovery module 128 and a memory organizer 124 to the ANN/GA optimizer 126. A sequenced inspection process plan from block 136 goes to a collision avoidance block 140, using other inputs as heuristics 110c and the inspector shown at 100d. A complete inspection process plan from block 140 goes to a save/retrieve file 142, and also to block 144 to generate CMM code. The CMM instructions go from block 144 to the CMM machine 160, with a hard copy 162.

Rapid Design System

The Rapid Design System is a feature-based CAD system in which "features" are used to describe the geometry and tolerancing of a part. More details of this representation can be found in LeClair, Steve, "Rapid Design System: Feature-Based Design", Proceedings of 1991 IEEE International Systems Conference, Dayton, Ohio, August 1991.

The RDS is encompassed by a project funded by the U.S. Air Force, with the cooperation of an Air Force design and manufacturing Test Wing, to develop an intelligent expert system which reduces the turnaround time of a product from design to manufacture and inspection.

The RDS is built upon the Concept Modeler™, a parametric design system from Wisdom Systems, Inc. The Concept Modeler™ is built upon Common LISP Operating System (CLOS), an object-oriented programming language with inheritance. The RDS uses these platforms to provide features used throughout the concurrent engineering system.

Figure 2:
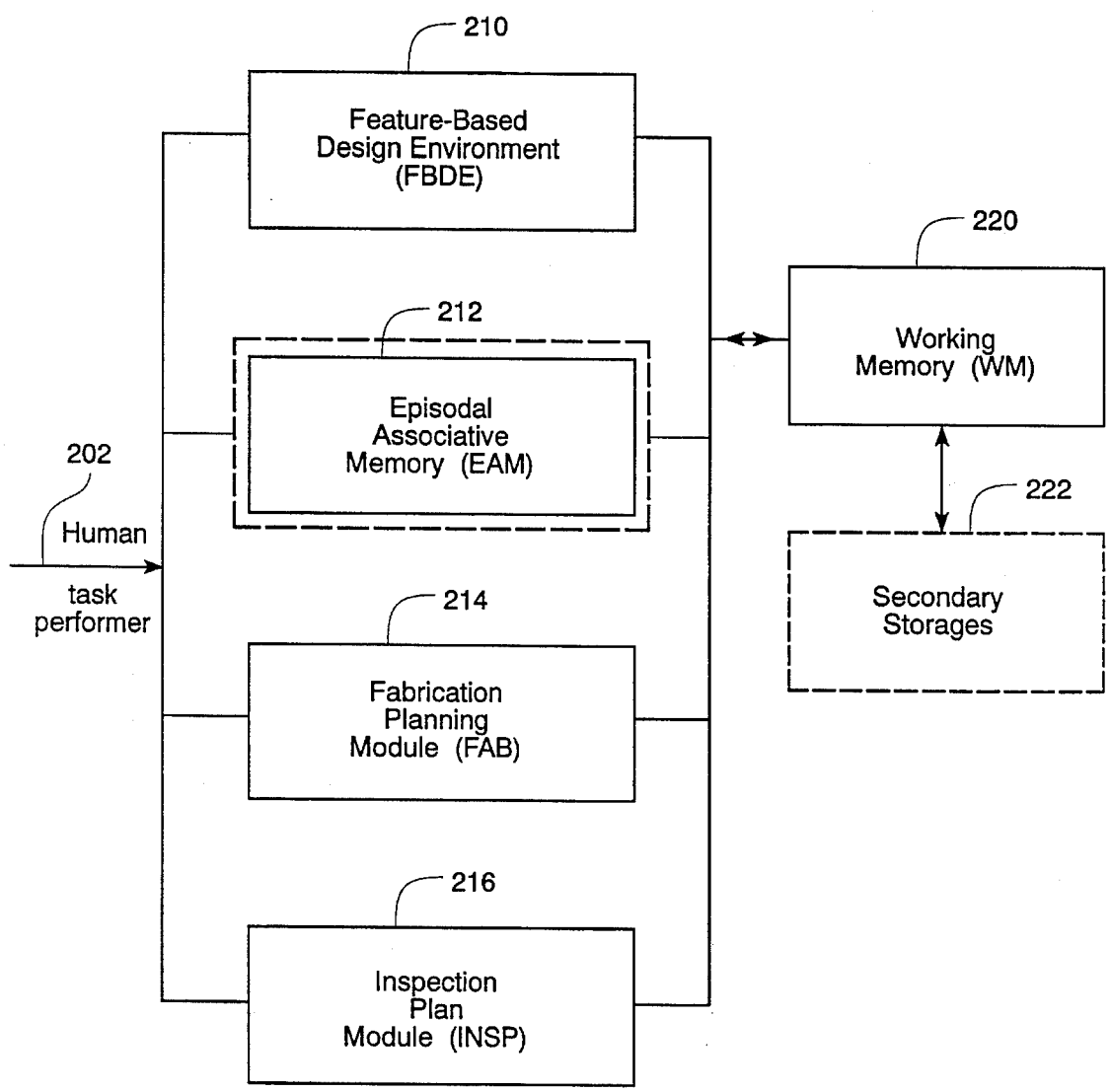
FIG. 2 is a diagram showing the modular systems architecture of a Rapid Design System (RDS)

The RDS comprises four modules shown in FIG. 2: the Feature-Based Design Environment 210 (FBDE), the Fabrication process planning module 214 (FAB-PLAN), the inspection planning and evaluation module 216 (IPEM), and the Episodal Associative Memory 212 (EAM), all of which interface with a Working Memory 220 (WM), which in turn interfaces with Secondary Storages 222. In addition, use is made of a commercially available object-oriented data base called ITASCA (registered TM) for PDES Research. The overall purpose of the RDS is to provide a common language that allows these different modules to be interconnected so that process planning and other artificial intelligence heuristics can use the translated data. Its goal is to relieve the manufacturer or inspector from the guess-work often involved in interpreting the tolerancing and functional design intent of a product once it is "thrown over the engineering wall".

Figure 3:
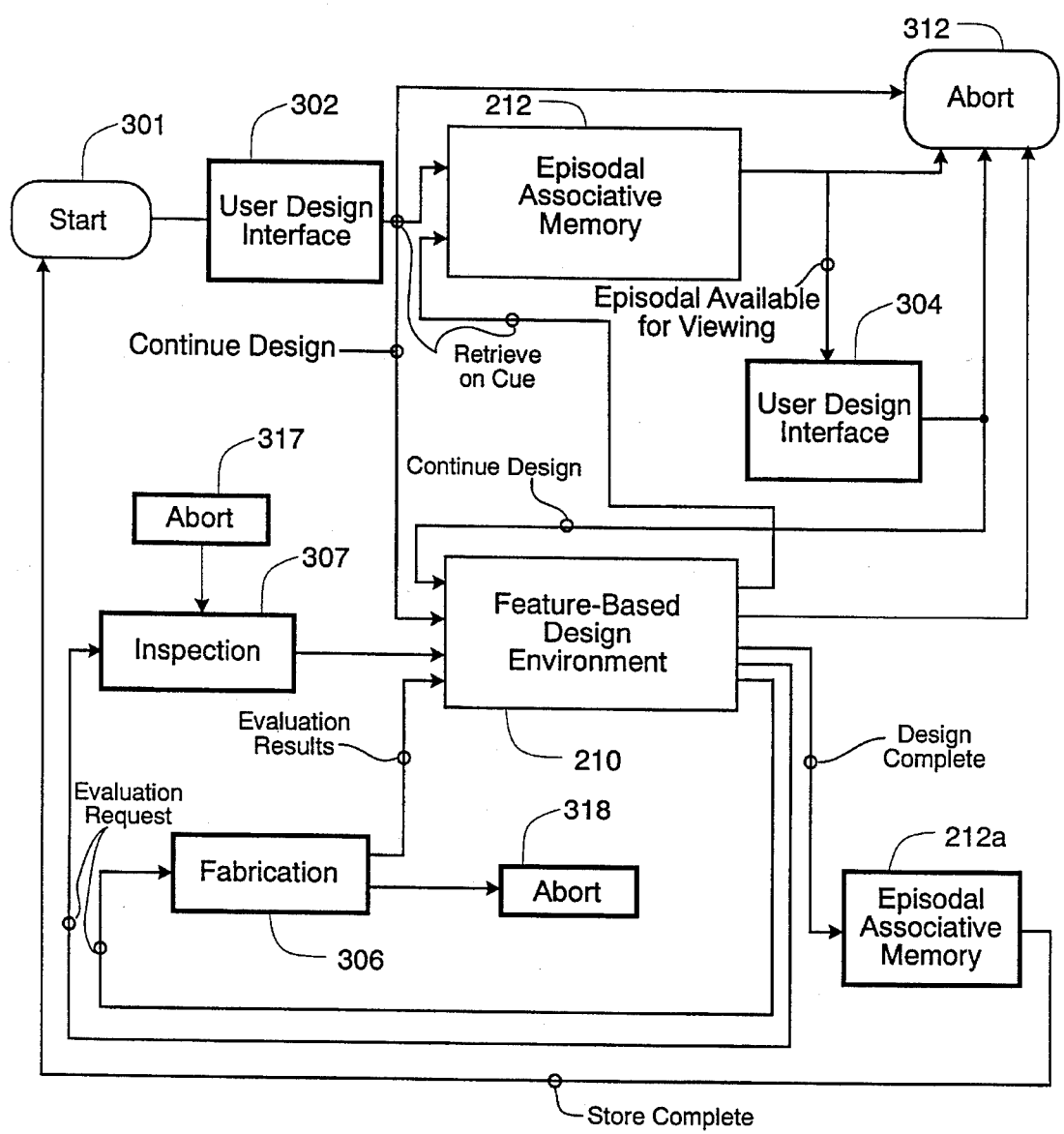
FIG. 3 is a diagram showing a possible scenario for use of the Rapid Design System (RDS)

An overview of how the different modules might interact in the design mode is provided by a schematic illustration shown in FIG. 3. Different utilization paths would be more appropriate for the Fabrication Process Planner for someone responsible for inspection.

In the design mode, the user starts at block 301 and the user design interface block 302 with a tentative design in the FBDE 210. He can ask the RDS if any similar design had been encountered in the past, or he can continue to carry out the new design entirely on his own. If the RDS is asked, the user enters into the EAM module 210 where previous remembered designs are recalled on the basis of the cues posed by the present active entative design. The recalled information is not just in the nature of a mechanical design, but will have with it pointers to items such as Problems Encountered (and Solved), or Potential Problems, and so on.

The user can modify any one of those previous designs and adopt it for his own or he might incorporate parts of several designs into his active design. He can also examine the "Fabrication Features and Plan" part of the part model with an evaluation request to block 306 to see if problems might be expected there. This process of recall, modify, incorporate, and improve a process can be carried out iteratively until the user is satisfied, at which point he can store the entire new design in the Episodal Associative Memory at block 212a.

The Episodal Associative Memory (EAM) 212 is a computer-based associative memory, whose purpose is to augment the human designer's memory by providing an institutional or collective memory for all phases of the product's life cycle (see Pao et al, "A Computer-Based Adaptive Associative Memory in Support of Design," *Proceedings of the* 1991 *IEEE Conference on System Engineering,* Aug. 3, 1991, Dayton Ohio, 49–55). Information regarding the successes and failures of a product from each of its production stages is stored in the memory. The life cycle memory includes information from the designer, manufacturer, and inspector. This experience data of similarly designed parts is then "remembered" by the memory when a new part is introduced into the system. The goal is to avoid costly mistakes that occurred previously and to reiterate positive factors of all aspects of the similar product's life cycle.

The Feature-Based design Environment (FBDE) 210 is the front-end CAD system where the designer creates the product. In the feature-based design paradigm, the product, or part model, is described in terms of features which represent higher-level concepts than the geometric primitives used in traditional CAD systems (see Radack et al, "The Rapid Design System: Memory-Based Design," *Proceedings of the* 1991 *IEEE Conference on System Engineering,* Aug. 3, 1991, Dayton, Ohio, 38–41). Most commercially available computer-aided drafting systems depict objects by geometric primitives: points, lines, curves, circles, etc.

The FBDE uses Constructive Solid Geometry (CSG) to represent the 3-D part model. One class of features, called "form features," contains both negative volume features such as holes and pockets, as well as positive volume features such as bosses and ribs. When attached to feature or sub-feature, negative volume features will remove material, while positive volume features will add material. Another class of features serves to modify the geometry of the form feature, e.g. chamfers and fillers.

The FBDE also represents dimensioning and tolerancing information within the part model using the feature paradigm. The representation conforms to the ANSI Y14.5M standard called Geometric Dimensioning and Tolerancing (GD&T), e.g. straightness, position, and flatness. These tolerance features are attached to geometric features or surfaces of the part model representing the proper GD&T callout procedure, as well as needed information in the process planner.

Fabrication Planning (FAB-PLAN) outputs the instruction code necessary to manufacture the part on a computer numerically-controlled (CNC) machine (see Westhoven, 1991, *Feature Sequencing in Process Planning using an Episodal Associative Memory,* Master's Thesis, Wright State University, Dayton, Ohio). Its input is the feature-based description of the product from the FBDE which is translated into fabrication features. FAB-PLAN uses a machine data base called Met-CAPP™, which determines the proper milling machine and corresponding speeds and feeds for each fabrication feature, then passes them as parameters into the process planner.

Inspection Planning and Evaluation Module (IPEM) automatically generates instruction code to be executed on a computer-controlled coordinate measurement machine (CMM). IPEM is the module that this specification discusses. The first step is the translation of the design/tolerance feature combinations from the FBDE into inspection features. The inspection process planner uses a generative approach to create the setups and sequencing of the tolerance measurements and evaluations. The path planner ensures an efficient path trajectory according to an inspection rule criteria, and them makes it a collision-free path. The automated code generator translates the inspection features into a language that the CMM will understand.

The Inspection Planning and Evaluation Module

According to the present invention, the representation of information as features is extended to inspection process planning where a set of tolerance geometries, both physical and conceptual, is created and compared in order to determine the usability of a manufactured part.

The RDS contains software modules to automate the design, manufacture, and inspection aspects of product fabrication, as well as an artificial intelligence memory to provide advanced storage and retrieval of designs. The automated inspection planner interfaces to the CAD system to receive the design, tolerance, and function intent information. The task of the automated inspection planner is to produce the inspection plan which properly evaluates the tolerances on the manufactured product. Important aspects of an automated inspection plan include a safe, collision-free, and efficient path trajectory throughout the probe-space. The output is generated as actual instruction code that controls the execution of the inspection planner on a computer controlled coordinate measurement machine. The output is complete and will require no human editing (or at least, no more than fine tuning or "tweaking") before the code can be executed.

Important elements of the automated inspection planner of the RDS include:
1. An artificial neural network that performs sequence optimization on the inspection points using an inspection rule based criterion.
2. A computationally efficient collision-avoidance algorithm which creates a safe path for the probe head to travel around the workpiece.
3. An automated code generator which produces the CMM instructions that will safely, efficiently, and correctly evaluate the tolerance on the workpiece.

We have created an interactive aid to the inspector which capitalizes on the complementary differences between man and computer. The most tedious, time consuming, and error-prone jobs for the inspector, are often easily and accurately programmed into the computer. Conversely, knowledge and experience are learned by the inspector, whereto the accumulation of enough experiences entitles one to be an expert in ones field. Our system wants to also help the inspector in his strengths, by recalling relevant past experiences, and learning from the inspector's input—thus creating a "self-improving" expert system that will grow along with the inspector.

The automated inspection planning architecture is shown in FIG. 1. The geometry and tolerance features are the input to the planner, and translated into inspection features used for solid-geometrical reasoning. AI heuristics use the inspection features and solid geometry to begin the process planning (as would an inspector):

1. The surfaces to be measured are determined based on the combination of design and tolerance features. Placing inspection points on these surfaces can be done using four different methods: 1) manually created; 2) automatically by rules (future); 3) automatically in a specified pattern or grid; or 4) the inspector moves the automatically created points. The number of points and position constraints are both factors that the experienced inspector learns. These rules can be captured by our initial rules or learned by our memory architecture. We have noticed that often a simple grid or pre-defined pattern is sufficient.

2. Once the preliminary inspection points are defined, all possible setups are created, based on inspection point visibility and accessibility tests. Optimization heuristics are used to remove the unnecessary setups. Algorithms can move points within their constraints to reduce the number of setups further. Since setups are guilty of the biggest time consumption, our goal is to create a plan with as few setups as possible.

3. There are different scenarios that determine the best sequence to place the inspection points for actual measurement and evaluation. Shortest probe distance (like the Traveling Salesman Problem) is not always the best sequence criteria. Several factors, such as familiarity of part, variant versus generative process planning, batch size, complexity and familiarity with tolerances, a priori knowledge, and inspector experience, all define different sets of criteria necessary to schedule the measurement points into the optimum sequence.

Our architecture proposes three ways for this sequence to be defined. The first is from optimization heuristics searching a weighted rule space to find the best sequence as defined by the rules. The search can be performed by heuristics, an ANN, or even a Genetic Algorithm (GA). Our invention also includes a self-improving mechanism for this stage in the process planning. Learning rules is performed using a discovery module (future) which detects relationships, or patterns, from the inspector's sequences. With sufficient iterations, these relationships can become strong enough to be used as rules for future sequences. The second method of point sequencing is by manual inspector selection (future). The third method recalls a similar inspection plan by using an associative memory. Either the sequence or the inspector weighted criteria from the retrieved plan can be used to sequence the points in the current plan (future).

4. Connecting the sequenced points creates the path that the CMM probe will travel. This path must then be evaluated against the geometry of the part-model, CMM table, and any fixtures for collisions. This check must be accurate and precise, as an unwanted collision will result in damaging the expensive probe head. This task is automated in our process planner. Using the solid geometry of the workpiece, the collision detection is calculated. If collisions are detected, collision avoidance procedures are executed which are responsible for positioning via points into the sequence of measurement points. There are four different collision avoidance routines, based on the geometry of the collision which is mapped into the computational complexity of creating the via point.

Currently the inspection plan is represented in a meta language format. This "generic" representation approach makes it easy to support a variety of specific CMMs (since each CMM vendor usually has its own proprietary inspection language) by simply changing the device specific translator. Even with vendors approaching DMIS (Dimensional Measurement Interface Specification) as a standard, there are other inspection apparatus, such as computer vision, eddy currents, and even manual inspection, that are also viable outputs for an inspection planner.

5. Finally, the desired result is produced—the inspection instruction code. This will usually entail a back-end translator generating the CMM code from the meta-language represented as inspection features. The result is an accurate set of instructions which is then transferred to the CMM (via diskette or network) and executed.

BACKGROUND

Geometric Dimensioning and Tolerancing (GD&T)

The inspection process is driven by tolerances specified by the designer. Tolerances are modeled on the ANSI Y14.5 standard and can be of two types; coordinate tolerances (also known as plus/minus or two point) and geometric tolerances.

Figure 4:
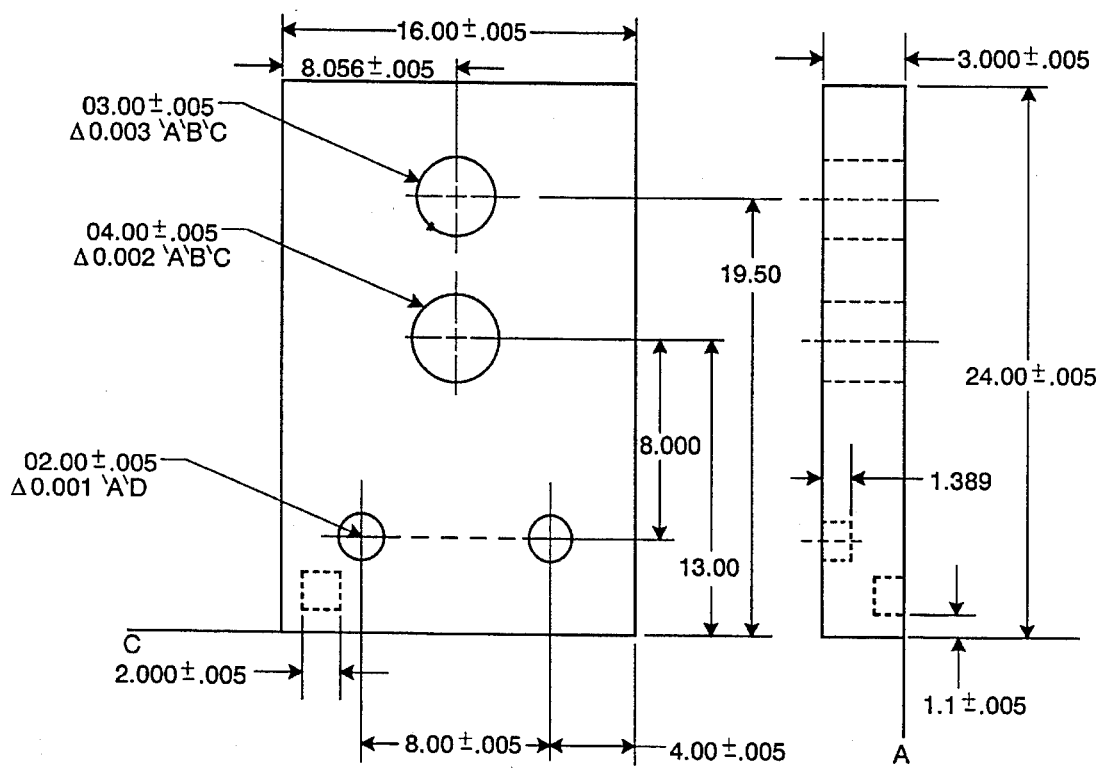
FIG. 4 is a diagram showing a sample part dimensioned and toleranced according to GD&T standard.

A coordinate tolerance, such as the tolerance of the distance between the left and right surfaces in FIG. 4, requires that two point measurements be taken and the distance between the points be evaluated. These are usually shown on an engineering drawing as a dimension with an associated plus/minus tolerance. If this distance is within the specified variation, then the tolerance is satisfied. Coordinate tolerances are used to specify relationships between two surfaces or lines and can be measured in any pose (position and orientation). Geometric tolerances, such as the position tolerances of the holes in FIG. 4, are more complex and can be used to specify allowable variations in the pose of a geometric feature or can be used to specify allowable variation in the intrinsic properties of a feature, e.g. cylindricity of a hole. Geometric tolerances such as those of position and angularity must be defined in Datum Reference Frames (DRFs). These are coordinate systems whose origin and orientation are uniquely specified by three datums. Datums can be either surfaces or lines (e.g., planes or the axes of holes). Points can also be used as datums but will not be considered here.

A DRF specifies the part coordinate system to be used for both measurement and evaluation of the part. For example, the datums labeled A, B, and C in FIG. 4 define the datum reference frame labeled as $|\overline{A}|\overline{B}|\overline{C}|$, which must be measured prior to verifying the hole position tolerances. FIG. 4 contains two different reference frames, ABC and ADC. It also contains four positional tolerances with two referring to the large through holes and two referring to the smaller blind holes.

Coordinate Measuring Machines

Figure 5:
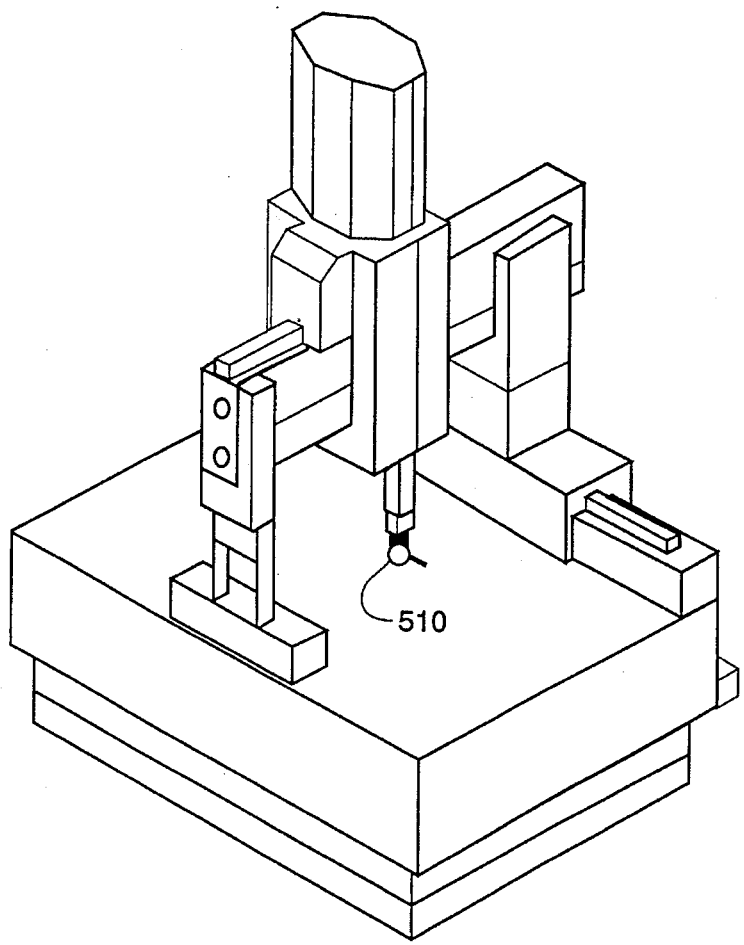
FIG. 5 is a pictorial diagram of a LK Micro Vector coordinate measuring machine (CMM)

A coordinate measuring machine is typically a gantry-type robot with three orthogonal degrees of freedom, as shown in FIG. 5. The "arm" of the CMM is equipped with a touch type probe 510 to make point measurements of the surface to be inspected. In general, the motion of the CMM is characterized by two distance commands: a "MOVE" command is used to move the probe at a high speed between measurements. It is important that this movement be collision-free. A 'MEAS' command moves the probe very slowly in the specified direction until the probe tip contacts the part. This command is used to acquire measurement data.

Simple touch probes are fixed in orientation and may consist of nothing more than a precision rod with a spherical tip. More sophisticated probes are similar to a robot wrist with two rotational degrees of freedom, as show in FIGS. 6a–6c.

Inspection

Consists of performing manual and/or automatic operations, or tasks, to evaluate the specified tolerances. The complete sequence of such operations, when executed, will result in the statement that a part meets or fails to meet all specified tolerances. Additional information such as which tolerances were not met, machining variation for process control, and the like, may also be provided.

Datum measurements and evaluations must be done before any geometric tolerances relate to a datum frame (e.g., the position tolerance with the ADC datum reference frame in FIG. 4). In general, when the primary datum (the first datum specified in a callout symbol, such as A in FIG. 4) is a plane, the part will be placed with its primary datum in contact with the inspection table. The inspection table is measured to determine their primary datum. This corresponds to the concept known as "hard gauging" and is the basis of inspection techniques derived from ANSI Y14.5.

ANSI Y14.5 inspection techniques were developed for "hard" gauges using surface planes, fences, plugs and the like. Inspection procedures using CMMs can only sample the surface at a finite number of points and evaluate the part geometry based upon those measurements. This process has been called "soft gauging" and can result in two basic problems in CMM inspection: 1) where to sample the surfaces and 2) how to interpret the sample measurements. We have used accepted industrial practices for the inspection and evaluation for the inspection and evaluation tolerances in designs produced with the Rapid Design System. Hybrid procedures requiring CMM measurements from manually placed fences or plugs are not implemented in the present version of the IPEM.

Representation

The RDS is intended to support "feature-based design," in which parts are described in terms of "features". Features can be other than purely geometric, with each discipline such as inspection having its own set of features as described below.

Form Features (D1)

Figures 7A, 7B, 7C, 7D, 7E, 7F, 7G:
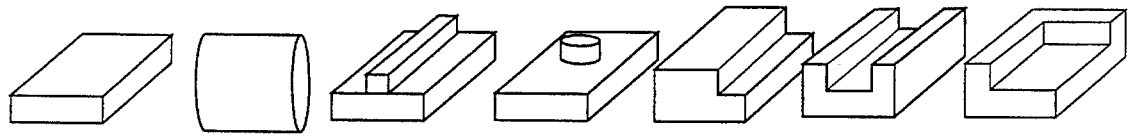
FIGS. 7a, 7b, 7c, 7d, 7e, 7f, 7g, 7h, 7i, 7j, 7k and 7l show pictorial views of several form features supported by the IPEM.
Figures 7H, 7I, 7J, 7K, 7L:
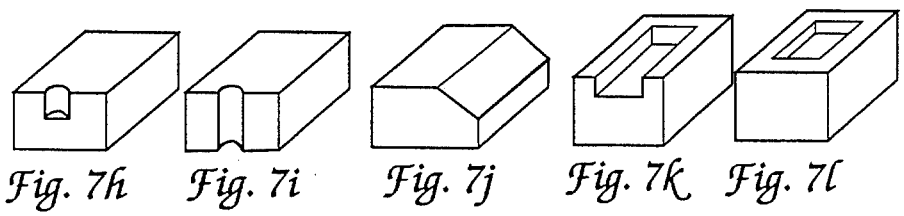

Form features define the form or shape of the part. Typical examples of form features include holes, pockets, ribs, bosses, slots, chamfers, and fillets. Many of these features can be further classified into subtypes. For example, holes can be blind of through, countersunk or not, with cone-shaped, flat, or spherical bottom (if blind). Form features can replace the geometric primitives (e.g., lines, curves, surface patches) used in traditional CAD systems to describe the shape of a part. FIGS. 7a–7l show the set of form features supported by the inspection planning module. FIG. 7a shows a block, 7b a cylinder, 7c a rib, 7d a boss, 7e a step, 7f a through slot, 7g a step to a shoulder, 7h a blind hole, 7i a through hole, 7j an edge cut, 7k an open pocket, and 7l a closed pocket.

In general, a single form feature will replace several geometric elements. For example, a "blind hole with flat bottom" feature would replace two geometric elements: a cylindrical surface and a flat disk-shaped surface. This does not include any fillets. In traditional systems, fillets and chamfers are normally not represented explicitly as geometric elements. They are added to a drawing as textual notes. In the RDS they are distinct geometric features.

GD&T Features (D4)

There are various formalisms for dimensioning and tolerancing mechanical designs. Most designers have used the plus/minus dimensioning convention exclusively. This convention is being supplanted by ANSI Standard Y14.5 which is becoming the notation of choice for dimensioning and tolerancing in engineering diagrams. The notation specified by the ANSI Y14.5 Standard, usually called "Geometric Dimensioning and Tolerancing," or more simply GD&T, is intended to specify, unambiguously, the allowed variation in shape of a manufactured part; this is not true of plus/minus dimensioning. More fundamentally, GD&T provides a richer framework that conventual plus/minus dimensioning for the designer to indicate functionality by precisely specifying a relationship to be measured.

Commercial CMM software is readily applicable for performing commands on features such as those shown in FIGS. 7a–7l. For example, simple commands will interpret a set of measurements as a hole and will compute the position and diameter of the hole from the measurements. The CMM community has developed a standard software language called DMIS (Dimensional Measurement Interface Specification) which allows the user to define the nominal points at which an object is to be inspected (i.e., measured by a CMM probe) and then automatically interpret those measurements in terms of a user-defined tolerance zone.

Figures 8A, 8B, 8C, 8D, 8E, 8F:
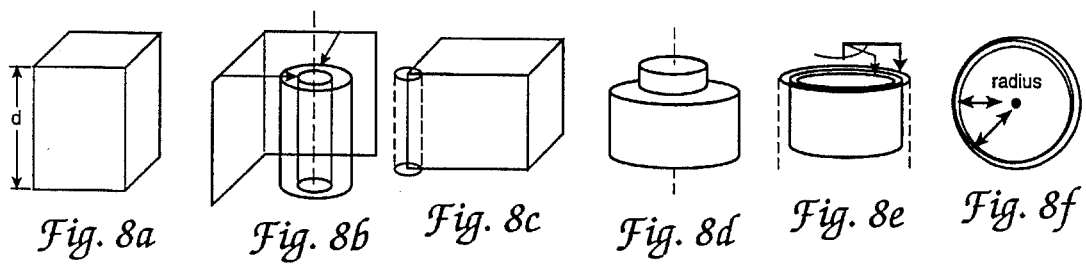
FIGS. 8a, 8b, 8c, 8d, 8e, 8f, 8g, 8h, 8i, 8j, 8k and 8l show pictorial views of several GD&T features supported by the IPEM (except for shaded objects)
Figures 8G, 8H, 8I, 8J, 8K, 8L:
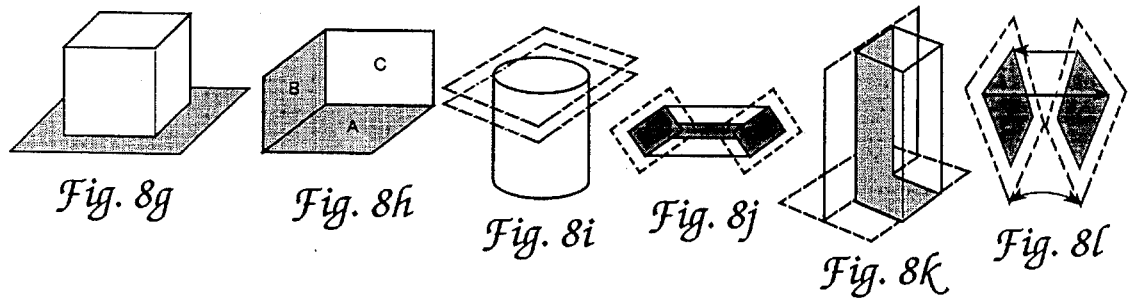

RDS inspection features based on GD&T and a subset of GD&T features are presently implemented in the RDS as shown graphically in FIGS. 8a–8l. FIG. 8a shows a basic dimension, 8b a position, 8c straightness, 8d concentricity, 8e cylindricity, 8f circularity, 8g simple datum, 8h datum reference frame, 8i flatness, 8j parallelism, 8k perpendicularity, and 8*l* angularity. GD&T features are subdivided into dimension, datums, and tolerances. A dimension is an intrinsic property of a form feature or a relationship such as a distance between form features. A datum is an ideal reference line or plane which is used in the evaluation of a form feature measurement. Datums can be located by appropriate datum positioning which makes physical contact with the high points of the reference surface or approximated from CMM measurements. Diameter refers to the diameter of a hole feature; position refers to the location of any form feature; straightness defines a maximum deviation from the center of an axis (straightness can apply to either an edge of a block; rib or prism feature or the surface of a cylinder); angularity is used to specify the angle between surfaces; perpendicularity is a specific instance of angularity where the angle is assumed to be 90°; and parallelism is another specific instance of angularity where the angle is assumed to be zero. In general, these implemented callouts either tolerance an intrinsic property of a form feature (such as straightness, flatness, or diameter), or a relationship between form features (such as a dimension). Relationships between surfaces belonging to an individual feature may be controlled by intrinsic attributes of that feature or by explicit GD&T callouts; relationships between surfaces belonging to different features must be specified using GD&T callouts.

Inspection Features (D3)

Inspection features are created as a result of the part designer's geometric and tolerance specifications. Where design (D1) features represent specific geometries, and GD&T (D4) features represent specific geometric tolerance zones, inspection features generate procedures for creating geometric constructs and evaluating measurements for a specified tolerance. Inspection features are similar to manufacturing features (D2) in that both are generated from a synthesis of the data in D1 and D4 features. Manufacturing features use geometric and tolerancing information to create a feature instance describing tool selection, cutting angles, speeds and feeds. IPEM constructs inspection features (which prescribe procedures to measure and evaluate tolerances) from the same geometric and tolerance information. An important distinction between the way manufacturing features and inspection features have been implemented is found in the object class definitions. Manufacturing features (such as "surface, cutter parallel" and "surface, cutter perpendicular") include in their definitions how the feature is to be manufactured. Inspection features use a more general class definition where specific inspection procedures are indicated by feature attributes rather than class definitions.

Inspection feature objects include:
 a definition of the toleranced geometry,
 a measurement attribute (how the inspection measurements are to be performed for this geometry),
 an evaluation attribute (how to evaluate the inspection measurements for the specified tolerance), and
 a comparison attribute (a boolean operation to determine if the evaluated comparisons satisfy the tolerance).

The D3 feature geometry is determined by the assignment of the tolerance information to the part geometry. This assignment implies the creation of basic geometric elements such as a point, axis, or surface, the result is a set of basic inspection features. For example,
 tolerancing the offset dimensions used to position a hole creates a point where the hole center belongs,
 tolerancing the perpendicularity of a hole requires the creation of an axis to determine the angular hole pose with respect to that surface,
 tolerancing the position of a slot requires the creation of an surface to determine the slot position.

A complete list of basic geometries that represent features upon which IPEM currently operates is shown in FIG. 9. The "virtual" features shown are geometries that are not an explicit component of the part geometry but are necessary to evaluate GD&T tolerances. For example, a designer using the RDS will explicitly specify a hole (as represented by its bounding surfaces) but the axis of that hole is not explicit in the RDS part model. However, for purposes of evaluating GD&T features the axis must become a separate geometric element upon which boolean geometric operations such as intersect or union can be performed.

Figure 9A:
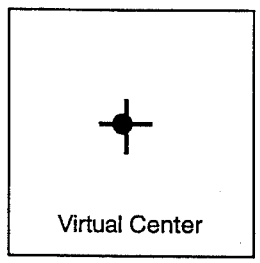
FIGS. 9a, 9b, 9c, 9d, 9e, 9f, 9g and 9h show basic inspection features that correspond to GD&T tolerance requests.
Figure 9B:
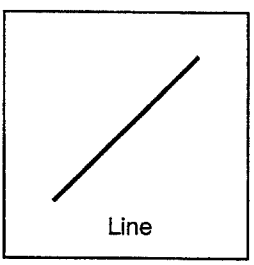
Figure 9C:
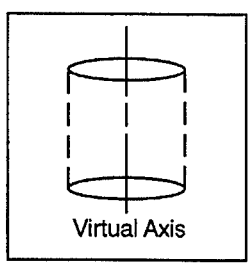
Figure 9D:
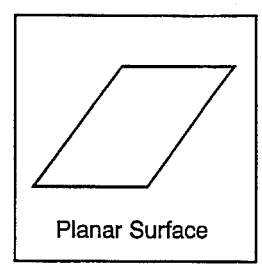
Figure 9E:
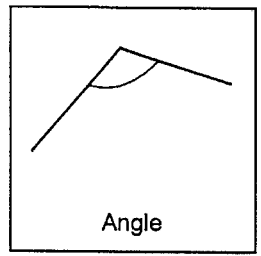
Figure 9F:
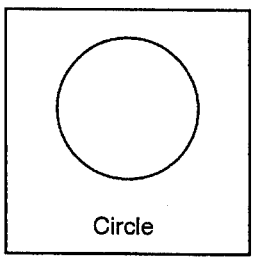
Figure 9G:
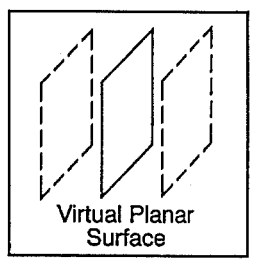
Figure 9H:
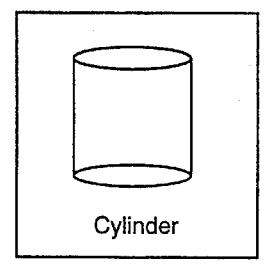

Basic inspection requests that correspond to GD&T tolerance requests are shown in FIGS. 9*a*–9*h*, with FIG. 9*a* showing a virtual center, 9*b* a line, 9*c* a virtual axis, 9*d* a planar surface, 9*e* an angle, 9*f* a circle, 9*g* a virtual plane surface, and 9*h* a cylinder. Although the inspection features can be represented by the simple range of geometries shown in FIG. 9, each expand into a variety of measurement and evaluation methods. The measurement technique is a function of the precision of the specified tolerance. The measurement task primarily consists of moving the CMM probe near the surface to be inspected and performing a sequence of probe touches (surface measurements) at calculated points. Local constraints on the measurement procedures include tolerance type, limited access of the probe to the surface, or varying degrees of surface continuity, i.e., the surface to be inspected may consist of several spatially disconnected surfaces.

Figures 10A, 10B, 10C:
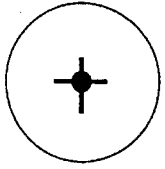
FIGS. 10a–10c are diagrams showing detailed inspection feature geometries, with a center feature shown in FIG. 10a, a line feature shown in FIG. 10b, and a virtual axis feature shown in FIG. 10c.
Figure 12A:
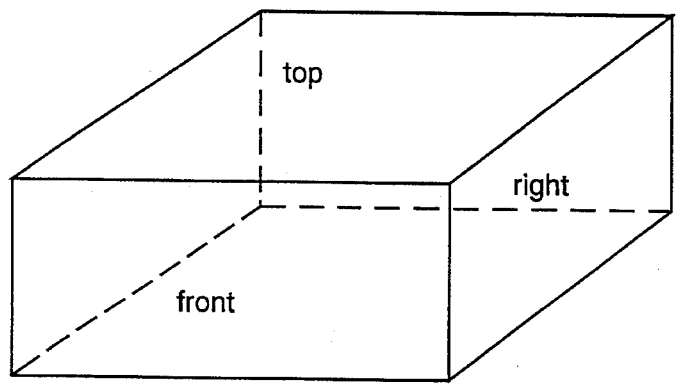
FIGS. 12a, 12b and 12c are a set of diagrams showing a starting block with a through slot attached to it, then a blind hole attached to the through slot.
Figure 12B:
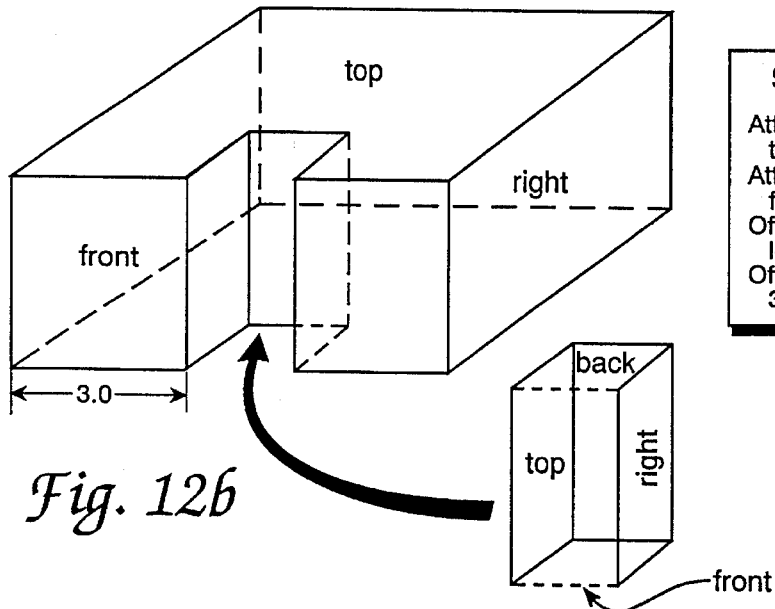
Figure 12C:
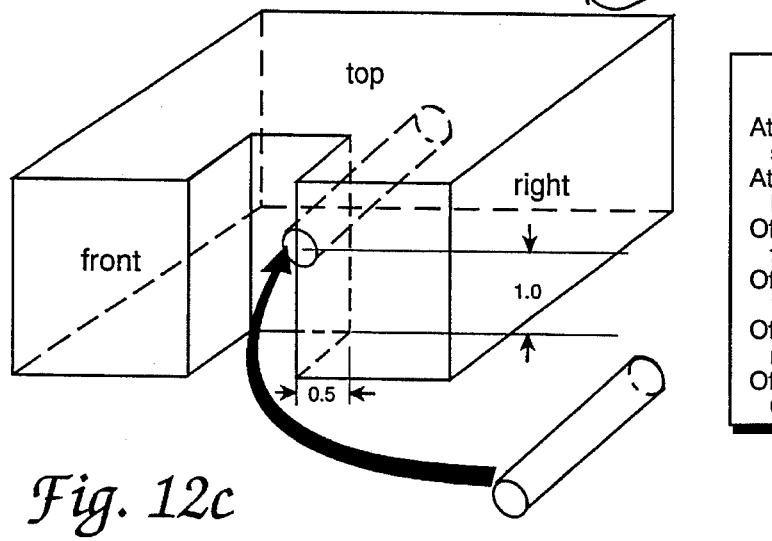

Tolerance type constraints determine the number and configuration of points based on the D1–D4 feature combination, samples of which are shown in FIG. 10*a*–10*c*. Accessibility of the CMM probe to the inspection surface is being treated as part of the inspection setup generation (to be described later in this section). Spatially disconnected surfaces will be treated as part of the intersection feature problem (also to be described later in this section). Proper implementation of these constraints requires an extension of the data structures used in the IPEM. Specifically, each geometric surface needs to maintain a bi-directional pointer to a nominal toleranced surface.

At present, only the tolerance type constraint is implemented. For the most part, the measurement techniques retrieve the minimum number of points needed to establish the inspection geometry feature. However, some tolerances such as flatness have no specific minimum number of inspection points. Some of the constraints specific to the inspection features of FIG. 9 are three noncollinear points to measure or evaluate a plane, four noncollinear points for a plane or plane circle, or four noncollinear points in two or more planes to measure and evaluate a cylindrical surface. FIGS. 10*a*–10*c* illustrates methods of creating the basic inspection features that arise from the geometric tolerances in FIGS. 9*a*–9*h*. Possible numbers of points and configurations needed to construct them are indicated.

Measurement variations that are not shown include constructs to evaluate the exact fit of a geometry to a tolerance zone. A good example is measuring and evaluating the flatness of a surface. A large number of points (10 or more) is needed to create a more accurate planar fit.

FIGS. 10*a*–10*c* presents a detailed description of inspection features; however, these features are the result of a particular combination of design and GD&T features. The inspection feature that is most appropriate to a specific toleranced geometry, i.e., a particular geometry and GD&T feature combination, is presented below.

Inspection Plan Features

The dimensions and corresponding inspection features described in FIGS. 11a, 11b, 12a, 12b and 12c represent specific instances of toleranced geometries. However, in order to produce an inspection plan which is an ordered (in a time optimal sense) sequence of inspection operations with no redundancies, i.e. unnecessary operations, much more information than the simple geometries is needed. The class of features, called Inspection Plan Fragments (IPFs), implemented in the IPEM includes additional information:

how the part surface is to be measured, how the part is to be oriented to permit inspection of that geometry, how the measurements are to be evaluated, how the evaluated geometry is to be compared with the tolerance specification, and how the inspection of that particular toleranced geometry is to be placed into an overall part inspection plan.

Inspection Plan Fragments are generated on a one-to-one basis from the GD&T features. Specifically, each Inspection Plan Fragment is created by linking each instance of a GD&T feature class to an Inspection Plan Fragment. FIG. 13 shows the relationships between the IPFs and the GD&T features for the part in FIG. 4. The positional tolerances on the large through holes are linked to the GD&T datum reference frame ABC through their specification. This relationship is shown as horizontal links in FIG. 13. Since the modules of the RDS are relatively independent interacting only through the part model or the Episodal Associative Memory, this structure allows the IPEM to create feature instances which can be manipulated and processed into an inspection process plan without modifying or otherwise altering any design (D1), tolerance (D4) or manufacturing (D2) features. This isolation is shown by the dashed horizontal line in FIG. 13.

Each IPF corresponds to a possible valid inspection procedure for the associated tolerance, and specifies:

the type of tolerance, a pointer to the GD&T feature which generated this IPF, the geometry, a list of the coordinates of the points to be sampled and the orientation of the CMM probe, how the measurements are to be evaluated, and how the evaluation is to be tested for the specified tolerance.

The IPFs generated from the GD&T features are valid when they do not interact. Herein, interacting form features are defined to be features which intersect geometrically in such a way that not all feature surfaces are present in their entirety. For each tolerance feature, separate IPFs can be generated for different CMM probes and probe orientations, and manual inspection tools (such as depth micrometers and plug gauges).

An IPF logically contains the following objects, each of which corresponds to one of the inspection features listed above:

measurement request: a link to the surface of a feature to be measured, the number of points to be measured, and any constraints on those points, e.g., that they be noncollinear.

evaluation request: a high-level representation of an evaluation to be performed.

comparison request: a high-level representation of a comparison to be performed.

The planner organizes the "request" objects listed above into a process plan. The process planner is responsible for eliminating redundant requests to the same surface(s), modifying the IPFs in the case of interacting features, and organizing the requests in a time-efficient manner. This will be described after a brief description of the IPEM feature class structure.

Evaluation Requests

These are data objects which contain information on how measurement data should be evaluated. Based on specification from the designer, the touch probe sample point data can produce geometries based on the following possible methods:

Least Square Fit: the most commonly used method; fitting a geometric object to sampled points.

Fitting points to mathematical equations for creation of various geometries: Line, Circle, Plane, and Sphere.

Maximum Inscribed or Minimum Circumscribed for circular surfaces only. Maximum Circumscribed: fitting the largest circle to set of points from without (outside); Minimum Inscribed: fitting the smallest circle to a set of points from within (inside).

These methods range from general to specific. The present IPEM's evaluation method is based on Least Square Fit, since our CMM language (CMES) makes use of it exclusively.

Comparison Requests

Comparison requests are also data objects but of a different kind. These compare the evaluated geometries with the tolerance constraint Geometries (referred to as D4 features, see FIG. 8). The constraint geometries are those which create the allowable tolerance zones within which the evaluated D3 geometries should fit.

The comparison task is proposed to be a Boolean operation. That is, either the part passes inspection or it does not. This process could also be expanded to determine the degree of failure, informing the inspector how it could be made to pass the inspection. For instance, a hole with a smaller diameter than specified can be bored again to meet the specifications. This assumes that the part is retrievable. On the other hand, a hole bored too large cannot be salvaged.

IPEM Class Structure

The class definitions of IPEM are based on CLOS (Common Lisp Object-Oriented System) rather than the class structure of the Wisdom Systems Concept Modeler (CM), a solid modeling commercial package used as a programming base. The reason behind this action is that objects created by the Concept Modeler are modifiable by the user, where CLOS objects are not. Users are not allowed access to the internal objects of the system; hence, the CLOS class structure was chosen.

Inspection Planning Algorithm

Figure 14:
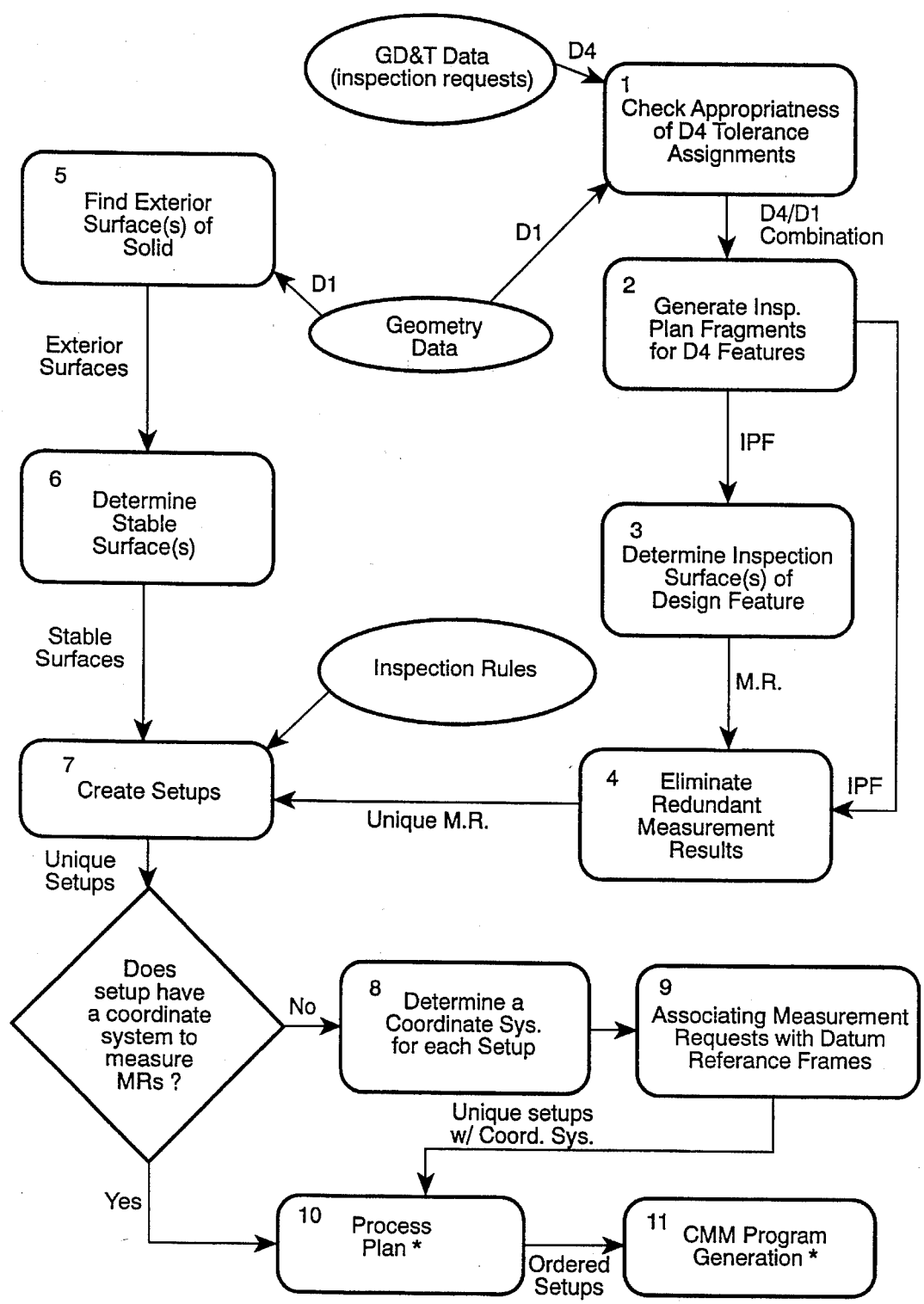
FIG. 14 is a flow chart of an inspection planning algorithm.

The steps for generating a part inspection plan are graphically illustrated in FIG. 14 described in greater detail below:

Step 1 Check Appropriateness of D4 Tolerance Assignments

Since it is theoretically possible to assign any GD&T tolerance (D4 features) to any form, feature (D1) there needs to be a mechanism for avoiding erroneous situations. For example, placing a cylindrical tolerance on a rib makes no sense. Therefore, the "Allowable D1–D4 Specification" table which contains information regarding GD&T tolerance and form features, is accessed each time a D4 feature is to be created. The entries of this table are "Y," "NA," and "NS." "Y" indicates that D1–D4 combination is appropriate. "NS" means that as far as the GD&T convention is concerned the D1–D4 combination is not standard but the system allows it anyway. "NA" stands for not allowable. The check for appropriatness is performed at the user interface level. A message is provided to the user if he/she selects a combination which results in an "NA" or "NS" entry. The present implementation of this is shown in Table 3 on page 69 of the technical report WL-TR-93-4021 by Pao et al, listed at the beginning of this DETAILED DESCRIPTION as item number 2 of six items.

Step 2 Generate Inspection Plan Fragment for D4 Features

Each D4 feature initiates an Inspection Plan Fragment (IPF) which is a set of specifications about how a D4 instance is to be inspected/evaluated. An IPF of the inspection feature and its class attributes were described under REPRESENTATION.

Step 3 Determine Inspection Surface(s) of Design Feature

Before the measurement request attribute of an IPF can be installed, the surfaces(s) of the form feature that will actually be inspected (measured) must be determined. For instance, when a position tolerance is placed on a blind hole, only the cylindrical side surface is be inspected. A position tolerance does not require any measurements of the bottom hole surface. Each D1–D4 combination specifies a certain set of D1 surface(s) to be inspected. This step specifies the correct set of surfaces by indentifying the existing surface(s) of each design feature. A measurement request (MR) instance is then generated for each specified surface. These MRs are then linked to the IPF which was generated for the D4 feature instance.

Step 4 Eliminate Redundant Measurement Requests

In the process of generating measurement requests for all datums and tolerances, multiple requests may have been generated for inspection of the same surface. For example, a blind or through hole inspected for perpendicularity and cylindricity will initially produce two IPFs with identical measurement requests. Since the information needed to evaluate both tolerances can be obtained from a single pass over inspection points on the same surface, only one set of points is required. Hence, these two MRs can be merged into one MR, provided that enough points are sampled to satisfy the requirements of both tolerances.

Step 5 Find Exterior Surface(s) of Solid

At some point in the inspection process the design model needs to be placed on the CMM table for inspection. For this to happen one needs to determine the flat exterior surfaces upon which the model can be placed. Some of these exterior surfaces may not be able to support the design model without the use of fixtures; therefore, it is necessary to determine which of these surfaces are stable. Hence, an exterior surface is either intrinsically stable or is considered unstable. The unstable surfaces may be designated as resting surfaces if fixturing is to be used. Currently no provision for fixturing is assumed.

Presently, exterior surfaces are identified by an offsetting method. A positive and negative offset surface is created parallel to each flat surface. These offset surfaces are then tested for intersections with the solid model. If both offsets intersect the solid model, the original surface (from which offsets were generated) will not become a candidate for stability test, otherwise the original surface will be tested.

Step 6 Determine Stable Surface(s)

Figure 16A:
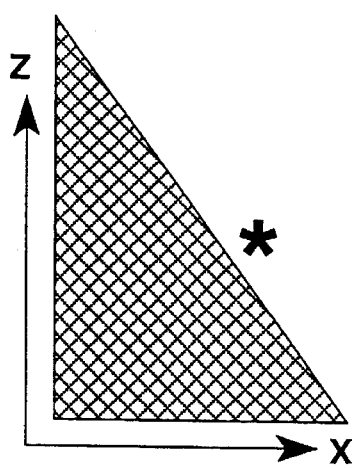
FIG. 16 shows surface stability using a 2-D convex hull algorithm.
Figure 16B:
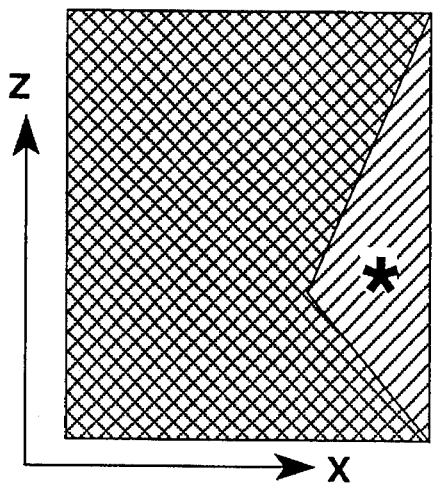

The stability test involves the transformation of the candidate surface to the X-Y plane followed by creation of a two-dimensional convex hull area for the surface in question (see Preparata, F. P. and S. J. Hong, "Convex Hulls of Finite Sets of Points in Two and Three Dimensions," *Communications of the ACM*, Vol. 20, No. 2, February 1977, pp.87–93). Projection of the center of the mass of the solid model onto the X-Z plane will determine the surface stability. FIG. 16 illustrates this method (here, the part would be sitting on the page with the shown surface down).

Step 7 Create Setups

Each stable surface establishes a possible part orientation for measuring the part in this step. Each surface to be inspected (i.e., one MR per surface) is assigned to a particular stable part orientation. This is done by orienting the part such that it is resting on an identified surface and then identifying which of the surfaces to be inspected can be accessed by the CMM in this part orientation. The set-up surface and list of accessible MRs are stored in the set-up class object. There exists one setup per stable surface. It is possible that a surface for inspection is inspectable in more than one setup. This redundancy is removed in later steps. Simple heuristics are used for determining which surfaces are inspectable in a particular orientation. For instance, only those inspection surfaces visible from a vantage point directly above the surface are accessible.

Figure 6A:
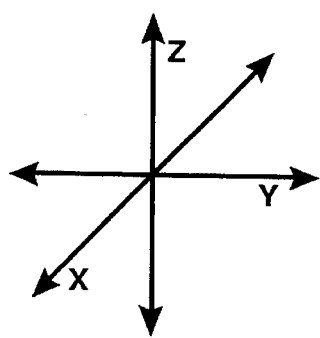
FIGS. 6a–6c are diagrams showing CMM movement configurations, with a simple xyz movement in FIG. 6a, a 2-degree-of-freedom probe holder in FIG. 6b, and extension, but no additional degree-of-freedom in FIG 6c.
Figure 6B:
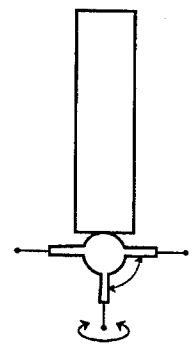
Figure 6C:

Currently the accessibility test applies to a probe holder with zero degrees of freedom (d.o.f.) as shown in FIG. 6c. That is, the CMM model is capable of movement in three directions, as in a xyz coordinate frame, as shown in FIG. 6a. Typically, a probe holder would add 1 or 2 additional degrees of freedom, as shown in FIG. 6b. Our model does not add degrees-of-freedom beyond the basic xyz movement. The current probe model is merely an extension of the robot arm in the z-direction.

The resulting heuristic, as mentioned, tests the space above each inspection point for collision with the part. If an obstruction is detected, the surface on which the inspection point is attached is not inspectable in this part orientation.

It is possible that the space directly above an inspection be free from obstruction although not accessible to the probe if the probe has to go through a small opening on its way to the inspection point. This is possible where two through slots are aligned across an open channel. To avoid an erroneous affirmation from the z-axis accessibility test, a geometric simulation of the CMM probe is created. For each point deemed accessible in the initial test, the probe simulation is positioned at that point as it would be if the actual CMM was taking the measurement. If an intersection between the part-model solid and the probe geometry is determined, the point accessibility is suspect. However, the case where the surface is accessible but the point placement is causing an intersection, the point is moved to a convenient location, accessible to the CMM probe. Again, an intersection test is performed. If the part solid and probe still collide, the surface is deemed inaccessible. Otherwise, it is accepted.

This test will be expanded, in later versions of the IPEM, to include probe holders which add additional degrees-of-freedom, as shown in FIG. 6b. Additional considerations to guarantee a collision-free path between inspection points and surfaces are also planned. This matter involves allowing avoidance of clamps and part features.

Step 8 Establishing a Coordinate Frame in each Setup

A CMM requires a reference point from which to locate points on the physical part. The CAD representation of the part comes with a reference frame, but it is not possible to transfer the electronic part origin to the CMM. The CMM origin must be located in the CMM frame of reference. The only way to establish the CMM origin is to manually manipulate the touch probe to specific points on the physical part.

The object of the manual manipulation is to establish the origin of a three-dimensional coordinate frame. The software used (CMES) establishes the origin by intersecting three ortho-normal vectors from the tactile data the operator provides. This can be accomplished in a number of ways by manipulating the touch probe to establish the simple geometric entities; plane, axis, or vertex. The required intersection vectors are created using the 3-2-1 isostasies principle. This principle says that any object can be completely fixed in space by the simultaneous contact on three, two, and one point, respectively, on each of three mutually perpendicular geometries. Essentially, what CMES requires is to locate these points on the appropriate geometries of the machined part with it fixed to the inspection table.

Figure 15:
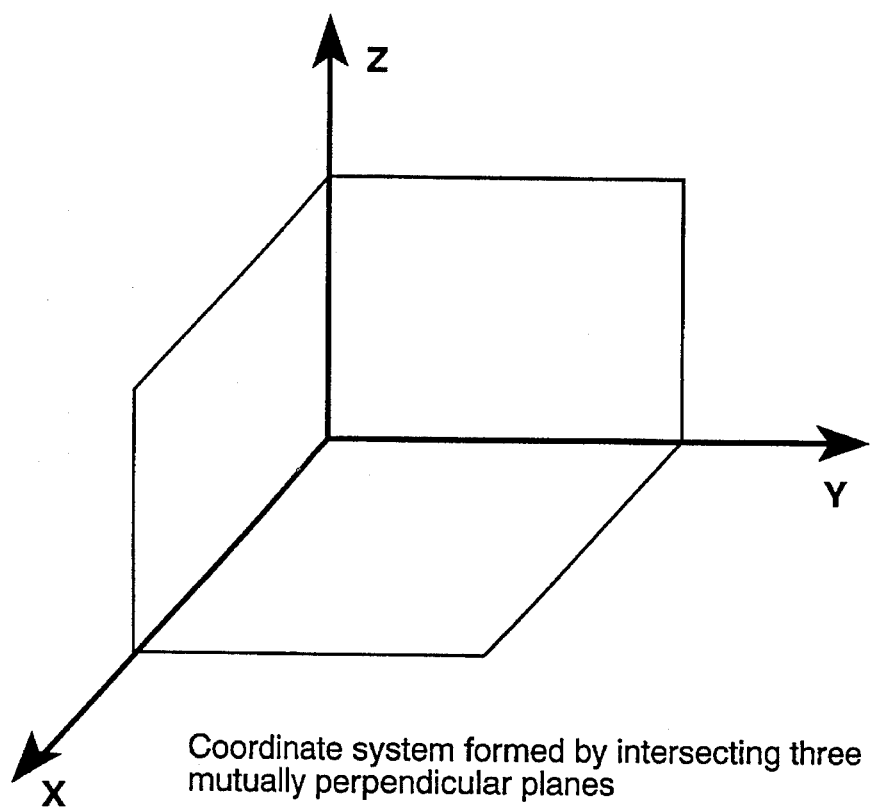
FIG. 15 is a diagram showing a coordinate system formed by intersecting three mutually perpendicular planes.

Typical geometric combinations are:
   three planes (abbreviated PPP, see FIG. 15)
   a plane, an axis, and a plane (abbreviated PAP, another is PPA)
   a plane and two axes (abbreviated PAA)

In GD&T tolerancing, the geometries mentioned would be referred to a datums, and the coordinate frame created called a datum reference frame (DRF). It is this coordinate frame within which location tolerances, a member of the "related" tolerance category, are specified (e.g., position, concentricity). Orientation tolerances, also related tolerances, are not evaluated with respect to a DRF, but may need a single datum (e.g., perpendicularity, parallelism). Form tolerances, categorized more generally as "individual" tolerances, need no reference entity at all (e.g., flatness, straightness).

As long as the part is oriented on the CMM inspection table so that all three of the required datums are accessible, a datum reference frame can be established by manually manipulating the CMM probe. It is also possible to establish a coordinate system without using specified datums or DRFs. The inspector may create his own by simply choosing the proper combination of geometries. There would then be the additional step of transforming the coordinates from the intended DRF origin to the created one.

Step 9 Associating Measurement Requests with Datum Reference Frames;

Presently, only DRFs are used to establish the coordinate frame in a setup. A valid setup is one in which all datums (of a DRF) can be accessed. The tolerances and other DRFs that are linked to the "setup" DRF (and are accessible), are grouped in the "measurement-in-DRF-list" property within the setup object. The measurement-in-DRF feature contains specific details about each DRF accessible in the orientation represented by the setup. The critical information being:

The DRF datums must be located by a manual manipulation of the CMM probe. Otherwise, which DRF datum(s) is located in the course of evaluating a tolerance (such as position, perpendicularity, etc.).

Which tolerances, accessible in a given part orientation, are related tolerances and which are individual.

This information is essential to the order in which part surfaces are probed. First of all, the DRF used to locate the part on the CMM table initially, must be probed manually. Therefore, the first action taken in the implementation of any inspection probe path plan must be to establish the physical location of the part using a DRF whose datums are of the individual type.

Secondly, if there are DRFs with datums that have related tolerances associated with them, the new coordinate frames cannot be established until those tolerances are evaluated. Hence, some general rules of inspection become evident:

1) the manual probing to establish the part location and a datum reference frame
2) tolerances that callout the initial DRF
3) the establishment of a DRF with related datum tolerances from list in step 2
4) tolerances that callout the DRF from 3

This sequencing is recursive at two levels: through each setup, and through the number of DRFs occurring in 3. This primary sequencing is performed on each valid setup. The next step is to sequence the minimum number of setups, remove the redundant ones, and sequence the measurement request within each setup.

Step 10 Process Plan

A process plan consists of two sub-processes: 1) an ordering of setups, and 2) an ordering of individual measurement requests within a setup. This can be seen as a global ordering and a local ordering, respectively. In global ordering, the goal is to find the minimum number of setups for complete inspection of the manufactured part. This is accomplished by first identifying the setup with the largest number of measurement requests (MRs), say setup X. Then, the MRs specified in X are removed from all other setups. This may lead to a situation where several setups may lose some or all of their MRs. Setups with no remaining MRs are eliminated from the processing plan and the remaining setups are ordered according to the size of their MR attribute.

Local ordering requires a logical grouping of MRs with the DRF that each MR references. If there are two (or more) DRFs in a setup, the measurement and evaluation of the second DRF's datums must precede the measurement of the tolerance which make use of the second DRF. Finally, within each grouping of MRs there is a spatial, "next closest" ordering.

MRs are grouped within the "measurement-in-DRF" object. The first MRs to be probed are those pertaining to the DRF datums. Establishing a DRF requires a surface probing order of primary, secondary, tertiary datums in a 3-2-1 point touch sequence. From the final tertiary point, the Euclidean Distance (ED) between this point and all sample points of every other MR in the current DRF coordinate system grouping is calculated. This grouping includes MRs from the related and individual type lists. The closest MR to the one just inspected is identified and placed next on the "final-MR-list". This is repeated until all MRs of each grouping have been processed. This procedure is performed on all DRFs in the present setup.

The spatial sequencing process could be optimized upon using a "traveling salesman" type algorithm, where minimizing travel time between target surfaces is the highest priority (see Jeon, O-Keon, "Efficient Inspection Fath Planning Algorithm," M.S. Thesis, Case Western Reserve University, Cleveland, Ohio, August, 1990). It will be possible to incorporate local optimization as the IPEM's highest order planning functions are completely developed.

Step 11 CMM Program Generation

Once the setups and MRs are ordered, the actual commands for the CMM are generated. The goal is to produce an ASCII file according to the specifications of CMES (Co-ordinate Measurement Software, the CMM operating language. CMES is a proprietary language of LK Tool of Cincinnati Milacron Co. This CMES text file will be transported (via modem, disks, or Ethernet) to the controlling PC of the CMM to be executed for inspection of the part.

First the MR feature objects are translated into the metacode feature objects. This translation to metacode in not a one-to-one ratio. The metacodes have different functions within the inspection plan: some measure and evaluate; some measure, save the points and evaluate; and some use saved points from other measurements to only evaluate. These differences arrive from the removal of redundant MRs, described above, where two tolerances on the same surfaces can use the same measurement points, just evaluated differently based on their tolerance. Once created, the metacode can be save to disk for future retrieval.

Before the metacode is translated into the desired CMM code, the inspector can perform an inspection plan similar to the inspection plan on the workstation. The simulator overlays the CMM probe path on top of the part model and checks for any intersections (collisions). This allows the inspector to get a feel for the inspection plan before it is executed, showing where the probe is scheduled to travel, warning the inspector of possible fixtures or a cluttered table-top. The simulation also allows the checking of efficient programming and gives the inspector opportunity to fine tune the inspection plan, if desired.

For each DRF in a metacode object produced by the process planner, the origin of the coordinate system is determined and translated into the coordinates of the sample point to the origin of the setup datum reference frame. Prior to this translation the sample point coordinates are based on the coordinate system of the solid modeler, with its origin located at the center of the part model. Using the measurement requests of each tolerance (contained in the IPF), a series of CMM-metacode instructions is produced. This metacode is currently generated only for a subset of GD&T tolerance/desian feature combinations, e.g., a position tolerance on a hole. The metacode is an intermediate description of the CMM commands and is independent of the actual language which operates the CMM. Even though our CMM uses the proprietary language CMES, most other commercial CMMs have adopted the ANSI Standard DMIS (Dimensional Measurement Interface Specification language. The use of an intermediate metacode allows the IPEM output to be easily altered to produce DMIS instructions. Once the instructions are created for a part, they are saved in the part model data base for future retrieval.

USING A RULE-BASED Artificial NETWORK (ANN) FOR INTELLIGENT SCHEDULING OPTIMIZATION An artificial neural network (ANN) is used to schedule the measurement points of the automated inspection process based upon inspection rule criteria. The Inspection Planning Evaluation Module (IPEM) is designed to aid the inspector by producing the process plan which will verify the tolerances of the workpiece. The process plan is structured in a manner that resembles how an experienced inspector would create the plan based on rules regarding the workpiece, tolerances, manufacturing processes, etc. Then the process plan is translated into automated inspection code. This code is ready to be downloaded to the CMM for program execution and workpiece evaluations.

The motivation of the rule-based ANN is to optimally sequence the inspection points based on the criteria an inspector would use. Today's automated process planners are producing viable output, but many require extensive time for deciphering, internalization, and then translation of the plan into a desired format or the company standard.

In 1985, Hopfield and Tank showed that neural networks could be used to solve optimization problems (J. J. Hopfield and D. W. Tank, "Neural Computation of Decisions in Optimization Problems," *Biological Cybernetics,* 52, 141–152, 1985); however, their results were actually slower than a popular heuristic search. Continued research produces improvements to the original network structure and energy functions that have allowed the ANN to obtain worthwhile results. The implementation of neural networks are now useful for a range of different optimization problems. The TSP has been an active research area for the Hopfield neural network producing optimum and near-optimum solutions in acceptable time.

Leaving the realm of theory and attacking specific, real-life problems where the answer is not known ahead of time, research for the ANN continues to increase. One example is work done by Kosiba, Wright, and Cobbs ("Discrete Event Sequencing as a Traveling Salesman Problem," *Computers in Industry,* 19, 317–327, 1992). They used a Hopfield neural network for optimized scheduling in a hot strip mill. They combined three primary production objectives into one cost function, setting up the problem as a generic TSP. The result was the minimized "distance" or cost scheduling the milling orders. However, our research effort has enhanced and expanded their work to include two types of rule structures (as matrices) generated from multiple types of rules, as compared to a single cost function. Combined with rule weights, preferences, and multiple rule generators, this ANN has a generous supply of information to produce an optimum sequence.

Many automated schedulers optimize the path trajectory of the CMM probe by ordering the offset points throughout the process plan based solely on Euclidean distance, i.e., finding the shortest path. However, an experienced QC engineer will not use this as the only criterion. The ordering of the measurement points within the inspection plan needs to follow three inspection criteria which will make up the rules and priorities of the rules within the ANN:

Criterion 1: Geometric Dimensioning and Tolerance (GD&T, or the ANSY Y14.5M-1982 standard rules of tolerance evaluation must be met.

Criterion 2: the plan should be executed in a safe (no damaging collision) and efficient manner.

Criterion 3: the plan needs to be understandable to the inspector, especially since it will be automatically generated and the inspector must then interpret it.

The ANN is adapted from the Hopfield neural network model; however, our goal is the intelligent ordering of inspection points based upon the three inspection criteria, not just one cost function. The approach to meet the inspection criteria is accomplished through rule-based weight matrices implemented within the Lyaponov energy function of the neural network. The weight matrices, created within the IPEM, are based upon desired QC techniques and rules that the inspector would use for inspection point sequencing throughout the inspection plan.

Two main accomplishments provided the implementation of the rule-based Hopfield network for optimization. The first accomplishment created a format, usable to the ANN, that contains the set of rules portraying the desires of the inspector in the inspection plan creation. The rules are based on relationships held between the inspection points, their tolerance callouts, and surfaces. Three different types of matrices were created from the inspection rules to be used by the ANN. The second accomplishment implemented a network motion equation that would include rules into the optimization.

Implementation: Creating the rule matrices

Two different forms of rules were realized to represent a preference in the inspection plan. For example, one inspection rule states that all "critical" tolerances must occur at the beginning of the sequence of measurements. The definition of "critical" is defined by the inspector, but typical definitions include tight tolerances, a priori hard to manufacture features, or SPC (statistical process control) recognition of previous evaluations that have been significantly out of tolerance. An S matrix (mnemonic for Sequence) represents this form of rule by telling the neural net whether a point i at sequence position j is allowed to exist according to the inspection rules $S_{ij}=1$ if the sequence position is allowed, and $S_{ij}=0$ if it is forbidden. The S matrix is illustrated in FIG. 17.

The second form of inspection rule quantifies the relationship of one inspection point sequence position to another inspection point sequence position. Two matrices fulfill this type of rule. The W matrix (mnemonic for Weight) is the standard distance matrix seen in TSP problems. $W_{ij}$ represents the Euclidean distance from point i to point j. The F matrix (mnemonic for Follow) represents the rule-based penalty value (or cost function) for point i being followed by point j at any two sequential time slots in the inspection plan. For example, it has been noted that many inspectors prefer similar tolerances to be measured sequentially. Therefore, one F-rule states that if two points, i and j, are from similar tolerances, then $F_{ij}$ should be an appropriate negative value (good), otherwise $F_{ij}$ should be an appropriate positive value (bad). The inspection rules currently implemented create a cumulative penalty value for $F_{ij}$ based on both good and bad reinforcements:

| | |
|---|---|
| bad (+) | the tolerance evaluation of j is dependent upon the tolerance evaluation of i |
| good (−) | i and j are the same feature type and have the same feature dimensions |
| bad (+) | i and j are from different tolerance callouts |
| bad (+) | i and j are on different surfaces |
| bad (+) | i and j are different types of features |
| bad (+) | i and j are different types of tolerances |
| good (−) | i and j are the same feature type |
| good (−) | i has a larger "critical" tolerance than j |
| bad (+) | j has a "critical" tolerance and i does not |
| good (−) | both i and j have "critical" tolerances |

The inspector can vary the relative strength of the individual inspection rules to customize the rules in order to produce the desired output. The strength parameters allow some rules to be weighted more heavily than others.

Notice that some inspection rules can be implemented in both the S and F matrices. This is advantageous to the ANN. By telling the ANN similar rule information in different formats, the search criteria becomes more robust, resulting in a better convergence.

Implementation: Creating the rule matrices

The neuron motion equation was modified to accommodate the new inspection rule information, shown as Equation (1) in FIG. 18. The W matrix remains the distance penalty as in previous TSP solutions. The F and S matrices are treated in the same manner as distance penalty functions. The $S_{ij}$ value is added to the update equation rather than subtracted, since it was defined as a positive value for preferable and zero for not preferable.

The A summation term monitors row and column constraints of only one cell "on" in each. The B summation term is the standard Euclidean distance term to be minimized, as described by Hopfield. The C summation term prevents the system from taking roundabout paths. The D summation term represents the hill-climbing function that helps the system escape local minima. The F summation term represents the penalties and bonuses from the F-rules according to the current system status of point i with respect to the points scheduled before and after it. As mentioned above, the $S_{ij}$ term is simply added into the neuron update equation to represent the inspection rule of point i occurring at sequence order j.

One inspection rule was implemented within the ANN to update the F coefficient according to the state of the system. The $F_{ij}$'s are created based on the F-rules, stating that a point with a certain characteristic, $c_1$, should/not follow a point with a different characteristic, $c_2$. However, at some moment in the inspection plan, the sequence of inspection points will have scheduled all the points with characteristic $c_1$ and will then switch to points with characteristic $c_2$. This switch over is preferable and should not be penalized. Therefore, the F coefficient is updated by an inspection rule within the ANN which sets F equal to zero.

RESULTS. FIG. 19 illustrates the greater usefulness of the rule-based ANN. The path starts with the tertiary datum point, since the datum reference must be created first (Criterion 1). The two larger through-holes near the ends of the part-model have "critical" tolerances defined by the inspection rules. Using the S and F matrices, the ANN places these two holes at the beginning of the inspection plan, then sequences the remaining tolerances. The two holes at the bottom of the pocket are sequenced next, utilizing a rule expressing that similar design features are scheduled sequentially. While meeting these inspection rules the ANN also provides the minimum distance path from the W matrix.

The ANN reached the solution for this simple example in 177 iterations, which is almost zero time on a SPARC-station 10! The speed, accuracy, and thoroughness of the rule-based ANN make it a viable solution method for scheduling optimization. The output path represents a sequence readable to the inspector, since they are created by the same rules that the inspector would use. This sequence is then translated into the desired CMM controlling language, Which can be downloaded directly to the CMM for execution.

CONCLUSIONS. The use of rule matrices in an ANN is a unique and successful way to use artificial intelligence to help produce a process plan that an expert would create. This helps both the expert and novice planner to understand the automatically generated plan quickly and requires little or no modifications before execution. The inspection plan structure is created for the most efficient result based on several information inputs and optimized by the same rule criteria used by QC personnel.

The ANN receives the rules in a robust manner, using three matrices which are each structured differently so as to encompass different types of sequencing rules, yet can duplicate some information to help the ANN to converge quickly. The matrices are created by inspection rules which have variable weights for user preferences to be implemented into the solution. The matrices are created from multiple rule-generators, including CAD features (design and tolerance), machining information, a priori inspection information, or directly from the inspector. Once the optimum schedule is obtained, the process plan is transformed to a code translator which then generates the executable code to perform the inspection plan on a SMM.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. Apparatus including computer means for generating a plan for inspection of a part using a coordinate measuring machine (CMM), in a feature-based rapid design system (RDS) having a Feature-Based Design Environment (FBDE) means, an Episodal Associative Memory (EAM), a Fabrication Planning (FAB) means, and an Inspection Plan (INSP) means, wherein features include form features (D1) which define the form or shape of the part, manufacturing features (D2), inspection features (D3), and geometric and design (GD&T) features (D4), wherein said Inspection Plan (INSP) means comprises:

a) means for checking appropriateness of D4 Tolerance assignments, using an "Allowable D1–D4 Specification" table which contains information regarding GD&T tolerance (D4) and form (D1) features, which is accessed each time a D4 feature is to be created;

b) means for generating an inspection plan fragment for D4 features, wherein each D4 feature initiates an Inspection Plan Fragment (IPF) which is a set of specifications about how a D4 instance is to be inspected/evaluated;

c) means for determining inspection surface(s) of design feature, which comprises specifying a set of surfaces by indentifying the existing surface(s) of each design feature, and then generating a measurement request (MR) instance for each specified surface, and linking these MRs to the IPF which was generated for the D4 feature instance;

d) means for eliminating redundant measurement requests by merging MRs when information needed to evaluate tolerances can be obtained from a single pass over inspection points on the same surface;

e) means for finding exterior surface(s) of solid to determine flat exterior surfaces upon which the model can be placed;

f) means for determining stable surface(s) by transformation of a candidate surface to an X-Y plane followed by creation of a two-dimensional convex hull area for the candidate surface, and projection of the center of the mass of the solid model onto the X-Z plane to determine the surface stability;

g) means for creating setups by orienting the part such that it is resting on an identified surface and then identifying which of the surfaces to be inspected can be accessed by the CMM in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

h) means for Establishing a coordinate frame in each setup by locating a CMM origin in a CMM frame of reference, establishing the origin by intersecting three ortho-normal vectors from tactile data provided the operator, the intersection vectors being created using a 3-2-1 isostasies principle;

i) means for associating measurement requests with datum reference frames (DRFs);

j) means for creating a process plan which consists of two sub-processes: 1) an ordering of setups (a global ordering), and 2) an ordering of individual measurement requests within a setup (a local ordering); a goal of global ordering being to find a minimum number of setups for complete inspection of the manufactured part, which is accomplished by first identifying a setup with the largest number of measurement requests (MRs), say setup X, and then removing MRs specified in X are from all other setups; wherein local ordering requires a logical grouping of MRs with the DRF that each MR references; and k) means for generating a CMM program, by first translating MR feature objects are into metacode feature objects, and then translating the metacode into CMM code, wherein for each DRF in a metacode object produced by the process planner, the origin of the coordinate system is determined and translated into the coordinates of the sample point to the origin of the setup datum reference frame.

2. Inspection Plan (INSP) means for generating a plan for inspection of a part using a coordinate measuring machine (CMM), in a feature-based rapid design system (RDS) including computer means, wherein said Inspection Plan (INSP) means comprises:

artificial Intelligence means for performing sequence optimization on inspection points using an inspection rule based criterion, including rules which represent a preference in the inspection plan, and rules which quantify relationships of inspection points in a sequence;

whereby the system uses optimization heuristics searching a weighted rule space to find the best sequence as defined by the rules.

3. Inspection Plan (INSP) means for generating a plan for inspection of a part using a coordinate measuring machine (CMM), in a feature-based rapid design system (RDS) including computer means having a Feature-Based Design Environment (FBDE) means, an Episodal Associative Memory (EAM), a Fabrication Planning (FAB) means, and said Inspection Plan (INSP) means, wherein features include form features (D1) which define the form or shape of the part, manufacturing features (D2), inspection features (D3), and geometric and design (GD&T) features (D4), wherein said Inspection Plan (INSP) means comprises:

an artificial neural network (ANN) having means for performing sequence optimization on inspection points using an inspection rule based criterion, including rules which represent a preference in the inspection plan, and rules which quantify relationships of inspection points in a sequence;

whereby the system uses optimization heuristics searching a weighted rule space to find the best sequence as defined by the rules.

4. Inspection Plan (INSP) means according to claim 3, wherein there is a format, usable to the ANN, that contains the set of rules portraying the desires of the inspector in the inspection plan creation, the rules being based on relationships held between the inspection points, their tolerance callouts, and surfaces.

5. Inspection Plan (INSP) means according to claim 4, wherein one inspection rule states that all "critical" tolerances must occur at the beginning of the sequence of measurements, the definition of "critical" being defined by the inspector, wherein said definitions include tight tolerances, a priori hard to manufacture features, or SPC (statistical process control) recognition of previous evaluations that have been significantly out of tolerance, wherein an S matrix (mnemonic for Sequence) represents this form of rule by telling the ANN whether a point i at sequence position j is allowed to exist according to the inspection rules $S_{ij}=1$ if the sequence position is allowed, and $S_{ij}=0$ if it is forbidden.

6. Inspection Plan (INSP) means according to claim 5, wherein a second form of inspection rule quantifies the relationship of one inspection point sequence position to another inspection point sequence position, wherein two matrices fulfill this type of rule, a W matrix (mnemonic for Weight) which is a distance matrix, wherein, $W_{ij}$ represents a Euclidean distance from point i to point j; and a F matrix (mnemonic for Follow) represents a rule-based penalty value (or cost function) for point i being followed by point j at any two sequential time slots in the inspection plan.

7. Inspection Plan (INSP) means according to claim 6, wherein one F-rule states that if two points, i and j, are from similar tolerances, then $F_{ij}$ should be an appropriate negative value (good), otherwise $F_{ij}$ should be an appropriate positive value (bad).

8. Inspection Plan (INSP) means according to claim 7, wherein the inspection rules create a cumulative penalty value for $F_{ij}$ based on both good and bad reinforcements as follows:

| | |
|---|---|
| bad (+) | the tolerance evaluation of j is dependent upon the tolerance evaluation of i |
| good (−) | i and j are the same feature type and have the same feature dimensions |
| bad (+) | i and j are from different tolerance callouts |
| bad (+) | i and j are on different surfaces |
| bad (+) | i and j are different types of features |
| bad (+) | i and j are different types of tolerances |
| good (−) | i and j are the same feature type |
| good (−) | i has a larger "critical" tolerance than j |
| bad (+) | j has a "critical" tolerance and i does not |
| good (−) | both i and j have "critical" tolerances | wherein the inspector can vary the relative strength of the individual inspection rules to customize the rules in order to produce the desired output, and the strength parameters allow some rules to be weighted more heavily than others;

wherein some inspection rules can be implemented in both the S and F matrices, whereby by telling the ANN similar rule information in different formats, the search criteria becomes more robust, resulting in a better convergence.

9. Inspection Plan (INSP) means according to claim 8, wherein a neuron motion equation accommodates new inspection rule information, as by the following equation, $$\frac{dU_{ij}}{dt} = \begin{cases} -\left( A \cdot \left( \sum_k^N V_{ik} + \sum_k^N V_{kj} - 2 \right) \right) \\ -\left( B \cdot \left( \sum_k^N V_{k,j+1} + \sum_k^N V_{k,j-1} \right) \cdot W_{ik} \right) \\ -\left( C \cdot \sum_{p=0}^N \sum_{q=0}^N V_{p,j-1} V_{p,j+1} \cdot W_{pij} \right) \\ +\left( D \cdot h\left( \sum_k^N V_{ik} \right) \cdot h\left( \sum_k^N V_{ik} \right) \right) \\ -\left( F \cdot \sum_k^N (V_{p,j-1} \cdot F_{pi} + V_{p,j+1} \cdot F_{ip}) \right) + S_{ij} \end{cases}$$

wherein the W matrix is a distance penalty function, the F and S matrices are treated in the same manner as distance penalty functions, the $S_{ij}$ value being added to the update equation, since it was defined as a positive value for preferable and zero for not preferable;

the A summation term monitors row and column constraints of only one cell "on" in each, the B summation term is a standard Euclidean distance term to be minimized, the C summation term prevents the system from taking roundabout paths, the D summation term represents a hill-climbing function that helps the system escape local minima, the F summation term represents the penalties and bonuses from the F-rules according to the current system status of point i with respect to the points scheduled before and after it, wherein as mentioned above, the $S_{ij}$ term is simply added into the neuron update equation to represent the inspection rule of point i occurring at sequence order j;

wherein one inspection rule was implemented within the ANN to update the F coefficient according to the state of the system, the $F_{ij}$'s are created based on the F-rules, stating that a point with a certain characteristic, $c_1$, should/should not follow a point with a different characteristic, $c_2$; however, at some moment in the inspection plan, the sequence of inspection points will have scheduled all the points with characteristic $c_1$ and will then switch to points with characteristic $c_2$, this switch over being preferable and should not be penalized, and therefore, the F coefficient is updated by an inspection rule within the ANN which sets F equal to zero.

10. Apparatus including computer means for generating a plan for inspection of a part by an inspector using a coordinate measuring machine (CMM), in a feature-based rapid design system (RDS) having a Feature-Based Design Environment (FBDE) means, an Episodal Associative Memory (EAM), a Fabrication Planning (FAB) means, and an Inspection Plan (INSP) means, wherein features include form features (D1) which define the form or shape of the part, manufacturing features (D2), inspection features (D3), and geometric and design (GD&T) features (D4);

wherein said Inspection Plan (INSP) means includes interaction means wherein the inspector can have interaction with the system to guide it to a desired result, wherein the inspector can define setups, measurement points, sequence for the points, and the via points, and wherein for the inspector's sequence input, a learning process being included, wherein the inspector's desired sequence is sent to discovery means for organizing patterns and defining rules, which by recalling relevant past experiences, and learning from the inspector's input, creates a "self-improving" expert system that will grow along with the inspector.

11. Apparatus according to claim 10, wherein the discovery module includes means for detecting relationships, or patterns, from the inspector's sequences, which with sufficient iterations, can become strong enough to be used as rules for future sequences; wherein said apparatus further includes means for point sequencing by manual inspector selection; and means for recalling a similar inspection plan by using an associative memory, wherein either the sequence or the inspector weighted criteria from the retrieved plan can be used to sequence the points in a current plan.

12. A method using computer means for generating a part inspection plan for a metrologic or material condition to be exercised by a robotic manipulator such as a coordinate measuring machine (CMM) using a tactile probe with additional transducers, wherein the object (herein_referred to as the part) to be inspected is represented in a feature-based design environment which comprises the steps:

a) generating an inspection plan fragment for inspection features constrained by function, shape, process and/or material conditions, wherein all conditions must be completed to initiate an Inspection Plan Fragment (IPF) which is a set of specifications about how an inspection feature is to be inspected/evaluated;

b) eliminating redundant measurement requests (MRs) by merging MRs when information needed to evaluate tolerances can be obtained from a single pass over inspection points on the same surface;

c) creating setups by orienting the part such that it is resting on an identified surface and then identifying which of the surfaces to be inspected can be accessed by the CMM in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

d) optimizing measurement requests within a minimum number of steps, which consists of two sub-processes: 1) an ordering of setups (a global ordering), and 2) an ordering of individual measurement requests within a setup (a local ordering);

e) generating an inspection program to be followed by a robotic manipulator, by first translating MR feature objects into metacode feature objects, and then translating the metacode into machine instruction code, wherein for each DRF in a metacode object produced by the process planner, the origin of the coordinate system is determined and translated into the coordinates of the sample point to the origin of the setup datum reference frame.

13. A method using computer means for generating a part inspection plan for a robotic manipulator such as a coordinate measuring machine (CMM) using a tactile probe with additional transducers, in a Feature-Based Design Environment (FBDE) module, an Episodal Associative Memory (EAM) module, a Fabrication Planning (FAB) module, and an Inspection Plan (INSP) module, wherein features include form (or geometric design) features (D1) which define the form or shape of the part, manufacturing features (D2), inspection features (D3), and geometric and design (GD&T) inspection features (D4), wherein said method uses the INSP module and comprises the steps:

a) checking appropriateness of D4 Tolerance assignments, using an "Allowable D1–D4 Specification" table which contains information regarding GD&T tolerance (D4) and form (D1) features, which is accessed each time a D4 feature is to be created;

b) generating an inspection plan fragment for D4 features, wherein each D4 feature initiates an Inspection Plan Fragment (IPF) which is a set of specifications about how a D4 instance is to be inspected/evaluated;

c) determining inspection surface(s) of design feature, which comprises specifying a set of surfaces by identifying the existing surface(s) of each design feature, and then generating a measurement request (MR) instance for each specified surface, and linking these MRs to the IPF which was generated for the D4 feature instance;

d) eliminating redundant measurement requests by merging MRs when information needed to evaluate tolerances can be obtained from a single pass over inspection points on the same surface;

e) finding exterior surface(s) of solid to determine flat exterior surfaces upon which the model can be placed;

f) determining stable surface(s) by transformation of a candidate surface to an X-Y plane followed by creation of a two-dimensional convex hull area for the candidate surface, and projection of the center of the mass of the solid model onto the X-Z plane to determine the surface stability;

g) creating setups by orienting the part such that it is resting on an identified surface and then identifying which of the surfaces to be inspected can be accessed by the CMM in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

h) establishing a coordinate frame in each setup by locating an inspection origin in an inspection frame of reference, establishing the origin by intersecting three ortho-normal vectors from tactile data provided the operator, the intersection vectors being created using a 3-2-1 isostasies principle;

i) associating measurement requests with datum reference frames (DRFs);

j) creating a process plan which consists of two sub-processes: 1) an ordering of setups (a global ordering), and 2) an ordering of individual measurement requests within a setup (a local ordering); a goal of global ordering being to find a minimum number of setups for complete inspection of the manufactured part, which is accomplished by first identifying a setup with the largest number of measurement requests (MRs), say setup X, and then removing MRs specified in X are from all other setups; wherein local ordering requires a logical grouping of MRs with the DRF that each MR references; and k) generating an inspection program to be followed by robotic manipulator, by first translating MR feature objects into metacode feature objects, and then translating the metacode into machine instruction code, wherein for each DRF in a metacode object produced by the process planner, the origin of the coordinate system is determined and translated into the coordinates of the sample point to the origin of the setup datum reference frame.

14. Apparatus including computer means for generating a plan for inspection of a part using a robotic manipulator such as a coordinate measuring machine (CMM) using a tactile probe with additional transducers, in a Feature-Based Design Environment (FBDE) means, an Episodal Associative Memory (EAM), a Fabrication Planning (FAB) means, and an Inspection Plan (INSP) means, wherein features include form (or geometric design) features (D1) which define the form or shape of the part, manufacturing features (D2), inspection features (D3), and geometric and design (GD&T) inspection features (D4), wherein said Inspection Plan (INSP) means comprises:

a) means for checking appropriateness of D4 Tolerance assignments, using an "Allowable D1–D4 Specification" table which contains information regarding GD&T tolerance (D4) and form (D1) features, which is accessed each time a D4 feature is to be created;

b) means for generating an inspection plan fragment for D4 features, wherein each D4 feature initiates an Inspection Plan Fragment (IPF) which is a set of specifications about how a D4 instance is to be inspected/evaluated;

c) means for determining inspection surface(s) of design features, which comprises specifying a set of surfaces by identifying the existing surface(s) of each design feature, and then generating a measurement request (MR) instance for each specified surface, and linking these MRs to the IPF which was generated for the D4 feature instance;

d) means for eliminating redundant measurement requests by merging MRs when information needed to evaluate tolerances can be obtained from a single pass over inspection points on the same surface;

e) means for finding exterior surface(s) of solid to determine flat exterior surfaces upon which the model can be placed;

f) means for determining stable surface(s) by transformation of a candidate surface to an X-Y plane followed by creation of a two-dimensional convex hull area for the candidate surface, and projection of the center of the mass of the solid model onto the X-Z plane to determine the surface stability;

g) means for creating setups by orienting the part such that it is resting on an identified surface and then identifying which of the surfaces to be inspected can be accessed by the robot manipulator in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

h) means for establishing a coordinate frame in each setup by locating an inspection origin in an inspection frame of reference, establishing the origin by intersecting three ortho-normal vectors from tactile data provided the operator, the intersection vectors being created using a 3-2-1 isostasies principle;

i) means for associating measurement requests with datum reference frames (DRFs);

j) means for creating a process plan which consists of two sub-processes: 1) an ordering of setups (a global ordering), and 2) an ordering of individual measurement requests within a set up (a local ordering); a goal of global ordering being to find a minimum number of setups for complete inspection of the manufactured part, which is accomplished by first identifying a setup with the largest number of measurement requests (MRs), say setup X, and then removing MRs specified in X are from all other setups; wherein local ordering requires a logical grouping of MRs with the DRF that each MR references; and k) means for generating an inspection program to be followed by robotic manipulator, by first translating MR feature objects into metacode feature objects, and then translating the metacode into CMM code, wherein for each DRF in a metacode object produced by the process planner, the origin of the coordinate system is determined and translated into the coordinates of the sample point to the origin of the setup datum reference frame.

15. Inspection Plan (INSP) means for generating a plan for inspection of a part using a robotic manipulator such as a coordinate measuring machine (CMM) using a tactile probe with additional transducers, including computer means, wherein said Inspection Plan (INSP) means comprises: artificial Intelligence means for performing sequence optimization on inspection points using an inspection rule based criterion, including rules which represent a preference in the inspection plan, and rules which quantify relationships of inspection points in a sequence; whereby the system uses optimization heuristics searching a weighted rule space to find the best sequence as defined by the rules.

16. Inspection Plan (INSP) means for generating a plan for inspection of a part using a robotic manipulator such as a coordinate measuring machine (CMM) using a tactile probe with additional transducers, including computer means having a Feature-Based Design Environment (FBDE) means, an Episodal Associative Memory (EAM), a Fabrication Planning (FAB) means, and said Inspection Plan (INSP) means, wherein features include form (or geometric design) features (D1) which define the form or shape of the part, manufacturing features (D2), inspection features (D3), and geometric and design (GD&T) inspection features (D4), wherein said Inspection Plan (INSP) means comprises: an artificial neural network (ANN) having means of performing sequence optimization on inspection points using an inspection rule based criterion, including rules which represent a preference in the inspection plan, and rules which quantify relationships of inspection points in a sequence; whereby the system uses optimization heuristics searching a weighted rule space to find the best sequence as defined by the rules.

17. Inspection Plan (INSP) means according to claim 16, wherein there is a format, usable to the ANN, that contains the set of rules portraying the desires of the inspector in the inspection plan creation, the rules being based on relationships held between the inspection points, their tolerance callouts, and surfaces.

18. Inspection Plan (INSP) means according to claim 17, wherein one inspection rule states that all "critical" tolerances must occur at the beginning of the sequence of measurements, the definition of "critical" being defined by the inspector, wherein said definitions include tight tolerances, a priori hard to manufacture features, or SPC (statistical process control) recognition of previous evaluations that have been significantly out of tolerance, wherein an S matrix (mnemonic for Sequence) represents this form of rule by telling the ANN whether a point i at sequence position j is allowed to exist according to the inspection rules $S_{ij}=1$ if the sequence position is allowed, and $S_{ij}=0$ if it is forbidden.

19. Inspection Plan (INSP) means according to claim 18, wherein a second form of inspection rule quantifies the relationship of one inspection point sequence position to another inspection point sequence position, wherein two matrices fulfill this type of rule, a W matrix (mnemonic for Weight) which is a distance matrix, wherein, $W_{ij}$ represents a Euclidean distance from point i to point j; and an F matrix (mnemonic for Follow) represents a rule-based penalty value (or cost function) for point i being followed by point j at any two sequential time slots in the inspection plan.

20. Inspection Plan (INSP) means according to claim 19, wherein one F-rule states that if two points, i and j, are from similar tolerances, then $F_{ij}$ should be an appropriate negative value (good), otherwise $F_{ij}$ should be an appropriate positive value (bad).

21. Inspection Plan (INSP) means according to claim 20, wherein the inspection rules create a cumulative penalty value for $F_{ij}$ based on both good and bad reinforcements as follows:

| | |
|---|---|
| bad (+) | the tolerance evaluation of j is dependent upon the tolerance evaluation of i |
| good (−) | i and j are the same feature type and have the same feature dimensions |
| bad(+) | i and j are from different tolerance callouts |
| bad (+) | i and j are on different surfaces |
| bad (+) | i and j are different types of features |
| bad (+) | i and j are different types of tolerances |
| good (−) | i and j are the same feature type |
| good (−) | i has a larger "critical" tolerance than j |
| bad (+) | j has a "critical" tolerance and i does not |
| good (−) | both i and j have "critical" tolerances, | wherein the inspector can vary the relative strength of the individual inspection rules to customize the rules in order to produce the desired output, and the strength parameters allow some rules to be weighted more heavily than others; wherein some inspection rules can be implemented in both the S and F matrices, whereby by telling the ANN similar rule information in different formats, the search criteria become more robust, resulting in a better convergence.

22. Inspection Plan (INSP) means according to claim 21, wherein a neuron motion equation accommodates new inspection rule information, as by the following equation, $$\frac{dU_{ij}}{dt} = \begin{cases} -\left( A \cdot \left( \sum_k^N V_{ik} + \sum_k^N V_{kj} - 2 \right) \right) \\ -\left( B \cdot \left( \sum_k^N V_{k,j+1} + \sum_k^N V_{k,j-1} \right) \cdot W_{ik} \right) \\ -\left( C \cdot \sum_{p=0}^N \sum_{q=0}^N V_{p,j-1} V_{p,j+1} \cdot W_{pij} \right) \\ +\left( D \cdot h\left( \sum_k^N V_{ik} \right) \cdot h\left( \sum_k^N V_{ik} \right) \right) \\ -\left( F \cdot \sum_k^N (V_{p,j-1} \cdot F_{pi} + V_{p,j+1} \cdot F_{ip}) \right) + S_{ij} \end{cases}$$

wherein the W matrix is a distance penalty function, the F and S matrices are treated in the same manner as distance penalty functions, the $S_{ij}$ value being added to the update equation, since it was defined as a positive value for preferable and zero for not preferable; the A summation term monitors row and column constraints of only one cell "on" in each, the B summation term is a standard Euclidean distance term to be minimized, the C summation term prevents the system from taking roundabout paths, the D summation term represents a hill-climbing function that helps the system escape local minima, the F summation term represents the penalties and bonuses from the F-rules according to the current system status of point i with respect to the points scheduled before and after it, wherein as mentioned above, the $S_{ij}$ term is simply added into the neuron update equation to represent the inspection rule of point i occurring at sequence order j; wherein one inspection rule was implemented within the ANN to update the F coefficient according to the state of the system, the $F_{ij}$'s are created based on the F rules, stating that a point with a certain characteristic, $c_1$, should/should not follow a point with a different characteristic, $c_2$; however, at some moment in the inspection plan, the sequence of inspection points will have scheduled all the points with characteristic $c_1$ and will then switch to points with characteristic $c_2$, this switch over being preferable and should not be penalized, and therefore, the F coefficient is updated by an inspection rule within the ANN which sets F equal to zero.

23. A method using computer means for generating a part inspection plan for a coordinate measuring machine (CMM), in a feature-based rapid design system (RDS), which comprises the steps:

a) generating an inspection plan fragment for D4 features, wherein each D4 feature initiates an Inspection Plan Fragment (IPF) which is a set of specifications about how a D4 instance is to be inspected/evaluated;

b) eliminating redundant measurement requests by merging MRs when information needed to evaluate tolerances can be obtained from a single pass over inspection points on the same surface;

c) creating setups by orienting the part such that it is resting on an identified surface and then identifying which of the surfaces to be inspected can be accessed by the CMM in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

d) optimizing measurement requests within a minimum number of steps, which consists of two sub-processes: 1) an ordering of setups (a global ordering), and 2) an ordering of individual measurement requests within a setup (a local ordering); and e) generating a CMM program, by first translating MR feature objects into metacode feature objects, and then translating the metacode into CMM code, wherein for each DRF in a metacode object produced by the process planner, the origin of the coordinate system is determined and translated into the coordinates of the sample point to the origin of the setup datum reference frame.

24. A method using computer means for generating a part inspection plan for a coordinate measuring machine (CMM), in a feature-based rapid design system (RDS) having a Feature-Based Design Environment (FBDE) module, an Episodal Associative Memory (EAM) module, a Fabrication Planning (FAB) module, and an Inspection Plan (INSP) module, wherein features include form features (D1) which define the form or shape of the part, manufacturing features (D2), inspection features (D3), and geometric and design (GD&T) features (D4), wherein said method uses the INSP module and comprises the steps:

a) checking appropriateness of D4 Tolerance assignments, using an "Allowable D1–D4 Specification" table which contains information regarding GD&T tolerance (D4) and form (D1) features, which is accessed each time a D4 feature is to be created;

b) generating an inspection plan fragment for D4 features, wherein each D4 feature initiates an Inspection Plan Fragment (IPF) which is a set of specifications about how a D4 instance is to be inspected/evaluated;

c) determining inspection surface(s) of design feature, which comprises specifying a set of surfaces by identifying the existing surface(s) of each design feature, and then generating a measurement request (MR) instance for each specified surface, and linking these MRs to the IPF which was generated for the D4 feature instance;

d) eliminating redundant measurement requests by merging MRs when information needed to evaluate tolerances can be obtained from a single pass over inspection points on the same surface;

e) finding exterior surface(s) of solid to determine flat exterior surfaces upon which the model can be placed;

f) determining stable surface(s) by transformation of a candidate surface to an X-Y plane followed by creation of a two-dimensional convex hull area for the candidate surface, and projection of the center of the mass of the solid model onto the X-Z plane to determine the surface stability;

g) creating setups by orienting the part such that it is resting on an identified surface and then identifying which of the surfaces to be inspected can be accessed by the CMM in this part orientation, the set-up surface and list of accessible MRs being stored in a set-up class object, using simple heuristics for determining which surfaces are inspectable in a particular orientation, wherein the resulting heuristic tests the space above each inspection point for collision with the part;

h) Establishing a coordinate frame in each setup by locating a CMM origin in a CMM frame of reference, establishing the origin by intersecting three orthonormal vectors from tactile data provided the operator, the intersection vectors being created using a 3-2-1 isostasies principle;

i) associating measurement requests with datum reference frames (DRFs);

j) creating a process plan which consists of two subprocesses: 1) an ordering of setups (a global ordering), and 2) an ordering of individual measurement requests within a setup (a local ordering); a goal of global ordering being to find a minimum number of setups for complete inspection of the manufactured part, which is accomplished by first identifying a setup with the largest number of measurement requests (MRs), say setup X, and then removing MRs specified in X are from all other setups; wherein local ordering requires a logical grouping of MRs with the DRF that each MR references; and k) generating a CMM program, by first translating MR feature objects into metacode feature objects, and then translating the metacode into CMM code, wherein for each DRF in a metacode object produced by the process planner, the origin of the coordinate system is determined and translated into the coordinates of the sample point to the origin of the setup datum reference frame.

* * * * *